US010813398B2

(12) United States Patent
Vandenbosch et al.

(10) Patent No.: US 10,813,398 B2
(45) Date of Patent: Oct. 27, 2020

(54) PERSONAL PROTECTIVE EQUIPMENT FOR CBRN OR OTHER PROTECTION

(71) Applicant: AIRBOSS ENGINEERED PRODUCTS INC., Acton Vale (CA)

(72) Inventors: Jill Vandenbosch, Montreal (CA); Jean-Francois Morissette, Ste-Hulene de Bagot (CA); Jean-Luc Lemyre, Granby (CA); Luc Dionne, Bromont (CA); Alexandre Meunier, Granby (CA)

(73) Assignee: AirBoss Engineered Products, Inc., Newmarket (CA)

( * ) Notice: Subject to any disclaimer, the term of this patent is extended or adjusted under 35 U.S.C. 154(b) by 846 days.

(21) Appl. No.: 14/772,497

(22) PCT Filed: Mar. 7, 2014

(86) PCT No.: PCT/CA2014/000198
§ 371 (c)(1),
(2) Date: Sep. 3, 2015

(87) PCT Pub. No.: WO2014/134715
PCT Pub. Date: Sep. 12, 2014

(65) Prior Publication Data
US 2016/0037839 A1     Feb. 11, 2016

(30) Foreign Application Priority Data

Mar. 7, 2013   (CA) .................................... 2808848

(51) Int. Cl.
*A41D 19/00*          (2006.01)
*A41D 19/015*         (2006.01)
(Continued)

(52) U.S. Cl.
CPC ....... *A41D 19/01576* (2013.01); *A41D 13/02* (2013.01); *A41D 19/0044* (2013.01);
(Continued)

(58) Field of Classification Search
CPC .......... A41D 19/01576; A41D 19/0065; A41D 19/0055; A41D 19/0075; A41D 19/0044; A62B 17/006
See application file for complete search history.

(56) References Cited

U.S. PATENT DOCUMENTS 4,416,026 A * 11/1983 Smith ................ A41D 19/0013
2/161.6
4,757,555 A * 7/1988 Gold ...................... A41D 13/08
2/16

(Continued)

OTHER PUBLICATIONS

International Search Report and Written Opinion dated Jul. 3, 2014 in connection with PCT Patent Application PCT/CA2014/000198, 14 pages.

(Continued)

*Primary Examiner* — Khaled Annis
(74) *Attorney, Agent, or Firm* — Tanner IP, PLLC

(57) ABSTRACT

An article of personal protective equipment, such as a protective glove, headgear, footwear, suit, or other protective device, wearable by a wearer for protecting the wearer against noxious agents, such as an article of chemical, biological, radiological and nuclear (CBRN) personal protective equipment. The article of personal protective equipment may comprise a plurality of regions that cover different parts of the wearer's body and have different properties, such as different levels of protection against noxious agents, breath ability, heat loss capability, dexterity, tactility, stretchability, and/or another function.

37 Claims, 23 Drawing Sheets

(51) Int. Cl.
   *A42B 3/28* (2006.01)
   *A41D 13/02* (2006.01)
   *A43B 7/00* (2006.01)
   *A62B 17/00* (2006.01)

(52) U.S. Cl.
   CPC .......... *A41D 19/0065* (2013.01); *A42B 3/288* (2013.01); *A43B 7/00* (2013.01); *A62B 17/006* (2013.01)

(56) References Cited

U.S. PATENT DOCUMENTS

| | | | |
|---|---|---|---|
| 6,156,421 A * | 12/2000 | Stopper | B32B 5/22 428/315.5 |
| 6,179,939 B1 * | 1/2001 | Jones, Jr. | B29C 55/065 156/164 |
| 6,185,747 B1 | 2/2001 | Hughes | |
| 6,909,028 B1 * | 6/2005 | Shawver | A61F 13/51462 428/198 |
| 6,993,793 B1 | 2/2006 | Li | |
| 7,553,779 B2 | 6/2009 | Wyner et al. | |
| 8,163,036 B1 * | 4/2012 | Vempati | A62D 5/00 8/115.51 |
| 2005/0268374 A1 | 12/2005 | Mattesky | |
| 2006/0115653 A1 * | 6/2006 | Soerens | A61B 42/60 428/423.1 |
| 2006/0143767 A1 | 7/2006 | Yang et al. | |
| 2007/0000017 A1 | 1/2007 | Hofmann | |
| 2007/0083980 A1 | 4/2007 | Yang et al. | |
| 2007/0181001 A1 * | 8/2007 | Bohringer | B01D 39/083 96/154 |
| 2009/0126074 A1 * | 5/2009 | Mattesky | A41D 19/0065 2/161.8 |
| 2010/0024095 A1 * | 2/2010 | Gellis | A41D 19/0065 2/161.8 |
| 2010/0325779 A1 * | 12/2010 | Matsunobu | B29C 41/14 2/167 |
| 2011/0179551 A1 | 7/2011 | VanErmen | |
| 2012/0266359 A1 | 10/2012 | Gellis | |

OTHER PUBLICATIONS

International Search Report and Written Opinion issued in connection with International PCT Application No. PCT/CA2014/000198 dated Jul. 3, 2014.
Extended European Search Report issued in connection with European Patent Application No. 14759639.9 dated Aug. 3, 2016.
Supplementary European Search Report issued in connection with European Patent Application No. 14759639.9 dated Aug. 22, 2016.

* cited by examiner

PERSONAL PROTECTIVE EQUIPMENT FOR CBRN OR OTHER PROTECTION

FIELD

The invention relates generally to personal protective equipment such as protective gloves, masks, suits, and other garments for chemical, biological, radiological and nuclear (CBRN) protection and other applications.

BACKGROUND

Personal protective equipment, such as protective gloves, protective masks, protective hoods, protective suits, protective overboots, etc., is used extensively in chemical, biological, radiological and nuclear (CBRN) defense or other applications to impart protection to a wearer from noxious agents (e.g., chemical agents, biological agents, radiological agents, and/or other poisonous or otherwise harmful agents that can cause disease, injury or death).

For example, a wearer may wear protective gloves, a protective mask, a protective suit, and/or protective overboots to protect himself/herself from exposure to noxious agents. Moreover, it is usually desirable for the wearer to be as comfortable and/or have as much dexterity or tactility as possible while wearing his/her protective equipment. This can present challenges in terms of design of the protective equipment. For instance, materials having desired protective properties may not always be conducive to comfort, dexterity or tactility. For example, elastomeric material such as rubber which is often used in such protective equipment due to its protective properties may not provide suitable heat management, breathability or moisture management to the wearer in some cases.

For these and other reasons, there is a need for improvements in personal protective equipment.

SUMMARY

According to an aspect of the invention, there is provided an article of personal protective equipment, such as a protective glove or other protective device, wearable by a wearer for protecting the wearer against noxious agents, such as an article of chemical, biological, radiological and nuclear (CBRN) personal protective equipment. The article of personal protective equipment comprises a plurality of regions that cover different parts of the wearer's body and have different properties, such as different levels of protection against noxious agents, breathability, heat loss capability, dexterity, tactility, stretchability, and/or another function.

According to another aspect of the invention, there is provided a protective glove wearable by a wearer for protecting the wearer against noxious agents, such as a CBRN protective glove. The protective glove comprises a plurality of regions that cover different parts of the wearer's body and have different properties, such as different levels of protection against noxious agents, breathability, heat loss capability, dexterity, tactility, stretchability, and/or another function.

According to another aspect of the invention, there is provided a protective glove for protecting a wearer against noxious agents. The protective glove comprises a hand covering for receiving a hand of the wearer. The hand covering comprises a palm portion for facing a palm of the wearer's hand, a back portion for facing a back of the wearer's hand, finger portions for receiving fingers of the wearer's hand, and a thumb portion for receiving a thumb of the wearer's hand. The protective glove comprises a cuff for receiving a wrist of the wearer and extending towards a forearm of the wearer. A plurality of regions of the protective glove have different properties and are disposed to cover different parts of at least one of the wearer's hand, wrist and forearm. Each of the regions of the protective glove provides a level of protection against noxious agents. The level of protection against noxious agents of relatively more protective ones of the regions of the protective glove is greater than the level of protection against noxious agents of relatively less protective ones of the regions of the protective glove. The relatively less protective ones of the regions of the protective glove are spaced apart from one another by the relatively more protective ones of the regions of the protective glove.

According to another aspect of the invention, there is provided a protective glove for protecting a wearer against noxious agents. The protective glove comprises a hand covering for receiving a hand of the wearer. The hand covering comprises a palm portion for facing a palm of the wearer's hand, a back portion for facing a back of the wearer's hand, finger portions for receiving fingers of the wearer's hand, and a thumb portion for receiving a thumb of the wearer's hand. The protective glove comprises a cuff for receiving a wrist of the wearer and extending towards a forearm of the wearer. A plurality of regions of the protective glove have different properties and are disposed to cover different parts of at least one of the wearer's hand, wrist and forearm. Each of the regions of the protective glove has a noxious fluid penetration resistance and a heat loss capability. The noxious fluid penetration resistance of a first subset of the regions of the protective glove is greater than the noxious fluid penetration resistance of a second subset of the regions of the protective glove. The heat loss capability of the first subset of the regions of the protective glove is less than the heat loss capability of the second subset of the regions of the protective glove. Respective ones of the second subset of the regions of the protective glove are spaced apart from one another by respective ones of the first subset of the regions of the protective glove.

According to another aspect of the invention, there is provided a protective glove for protecting a wearer against noxious agents. The protective glove comprises a hand covering for receiving a hand of the wearer. The hand covering comprises a palm portion for facing a palm of the wearer's hand, a back portion for facing a back of the wearer's hand, finger portions for receiving fingers of the wearer's hand, and a thumb portion for receiving a thumb of the wearer's hand. The protective glove comprises a cuff for receiving a wrist of the wearer and extending towards a forearm of the wearer. A plurality of regions of the protective glove have different properties and are disposed to cover different parts of at least one of the wearer's hand, wrist and forearm. A first subset of the regions of the protective glove includes a first material. A second subset of the regions of the protective glove includes a second material different from the first material. The first material and the second material are joined by the first material extending into the second material.

According to another aspect of the invention, there is provided a protective glove for protecting a wearer against noxious agents. The protective glove comprises a hand covering for receiving a hand of the wearer. The hand covering comprises a palm portion for facing a palm of the wearer's hand, a back portion for facing a back of the wearer's hand, finger portions for receiving fingers of the wearer's hand, and a thumb portion for receiving a thumb of the wearer's hand. At least one of the hand covering and the cuff comprises an elastomeric material and a fabric material. The elastomeric material and the fabric material are joined by the elastomeric material penetrating the fabric material.

According to another aspect of the invention, there is provided a CBRN protective glove comprising a hand portion for receiving a hand of a wearer. The hand portion includes a palm portion for facing a palm of the wearer's hand, a back portion for facing a back of the wearer's hand, finger portions for receiving fingers of the wearer's hand, and a thumb portion for receiving a thumb of the wearer's hand. The CBRN protective glove comprises a cuff portion for receiving a wrist of the wearer and extending toward a forearm of the wearer. The palm portion is characterized by a level of protection against ingress of noxious agents that is higher than a level of protection against ingress of noxious agents manifested by the back portion. The back portion is characterized by a level of body comfort that is higher than a level of body comfort manifested by the palm portion.

According to another aspect of the invention, there is provided a CBRN protective glove comprising a hand portion for receiving a hand of a wearer. The hand portion includes a palm portion for facing a palm of the wearer's hand, a back portion for facing a back of the wearer's hand, finger portions for receiving fingers of the wearer's hand, and a thumb portion for receiving a thumb of the wearer's hand. The CBRN protective glove comprises a cuff portion for receiving a wrist of the wearer and extending toward a forearm of the wearer. One of the portions includes a fibrous material. The fibrous material includes fibers defining interstices therebetween. Another of the portions includes a membranous material. The fibrous material is jointed to the membranous material along an area of juncture. The fibers of the fibrous material at the area of juncture are embedded in the membranous material.

According to another aspect of the invention, there is provided a CBRN protective glove comprising a hand portion for receiving a hand of a wearer. The hand portion includes a palm portion for facing a palm of the wearer's hand, a back portion for facing a back of the wearer's hand, finger portions for receiving fingers of the wearer's hand, and a thumb portion for receiving a thumb of the wearer's hand. The CBRN protective glove comprises a cuff portion for receiving a wrist of the wearer and extending toward a forearm of the wearer. One of the portions includes a fibrous material. The fibrous material includes fibers defining interstices therebetween. Another of the portions includes a membranous material. The fibrous material is jointed to the membranous material along an area of juncture. The membranous material penetrates within the interstices of the fibrous material in the area of juncture.

According to another aspect of the invention, there is provided a CBRN protective glove comprising a hand portion for receiving a hand of a wearer. The hand portion includes a palm portion for facing a palm of the wearer's hand, a back portion for facing a back of the wearer's hand, finger portions for receiving fingers of the wearer's hand, and a thumb portion for receiving a thumb of the wearer's hand. The CBRN protective glove comprises a cuff portion for receiving a wrist of the wearer and extending toward a forearm of the wearer. The CBRN protective glove has a variable stretchability profile along a longitudinal axis thereof.

According to another aspect of the invention, there is provided a CBRN protective glove comprising a hand portion for receiving a hand of a wearer. The hand portion includes a palm portion for facing a palm of the wearer's hand, a back portion for facing a back of the wearer's hand, finger portions for receiving fingers of the wearer's hand, and a thumb portion for receiving a thumb of the wearer's hand. The CBRN protective glove comprises a cuff portion for receiving a wrist of the wearer and extending toward a forearm of the wearer. The CBRN protective glove has a stretchability in a direction transverse to a longitudinal axis of the CBRN protective glove which is higher in the cuff portion than in an area that is adjacent the cuff portion and located above the cuff portion, away from the forearm of the wearer.

According to another aspect of the invention, there is provided a CBRN protective glove comprising a hand portion for receiving a hand of a wearer. The hand portion includes a palm portion for facing a palm of the wearer's hand, a back portion for facing a back of the wearer's hand, finger portions for receiving fingers of the wearer's hand, and a thumb portion for receiving a thumb of the wearer's hand. The CBRN protective glove comprises a cuff portion for receiving a wrist of the wearer and extending toward a forearm of the wearer. The CBRN protective glove has a stretchability in a direction transverse to a longitudinal axis of the CBRN protective glove which is higher in the cuff portion than in an area that is adjacent the cuff portion and located below the cuff portion, toward the forearm of the wearer.

According to another aspect of the invention, there is provided a CBRN protective glove. The CBRN protective glove comprises a hand covering for receiving a hand of a wearer. The hand covering comprises a palm portion for facing a palm of the wearer's hand, a back portion for facing a back of the wearer's hand, finger portions for receiving fingers of the wearer's hand, and a thumb portion for receiving a thumb of the wearer's hand. The CBRN protective glove comprises a cuff for receiving a wrist of the wearer and extending towards a forearm of the wearer. An end portion of a fingertip part of a given one of the finger portions and the thumb portion is thicker than a palm-side portion of the fingertip part and is closer to a backside portion of the fingertip part.

According to another aspect of the invention, there is provided a CBRN protective glove. The CBRN protective glove comprises a hand covering for receiving a hand of a wearer. The hand covering comprises a palm portion for facing a palm of the wearer's hand, a back portion for facing a back of the wearer's hand, finger portions for receiving fingers of the wearer's hand, and a thumb portion for receiving a thumb of the wearer's hand. The CBRN protective glove comprises a cuff for receiving a wrist of the wearer and extending towards a forearm of the wearer. At least one of the hand covering and the cuff is configured to react to presence of a noxious agent to undergo a change indicative of the presence of the noxious agent.

According to another aspect of the invention, there is provided a CBRN protective glove comprising a hand portion for receiving a hand of a wearer. The hand portion includes a palm portion for facing a palm of the wearer's hand, a back portion for facing a back of the wearer's hand, finger portions for receiving fingers of the wearer's hand, and a thumb portion for receiving a thumb of the wearer's hand. The CBRN protective glove comprises a cuff portion for receiving a wrist of the wearer and extending toward a forearm of the wearer. The palm portion is characterized by a level of protection against ingress of noxious agents that is higher than a level of protection against ingress of noxious agents manifested by the back portion. The back portion is characterized by a level of body comfort that is higher than a level of body comfort manifested by the palm portion. The palm portion includes a resilient membranous material which extends to the cuff portion. The membranous material in the cuff portion is configured to resiliently stretch when the hand of the wearer is inserted through the cuff portion as the wearer inserts the hand in the glove.

According to another aspect of the invention, there is provided a CBRN protective glove comprising a hand portion for receiving a hand of a wearer. The hand portion includes a palm portion for facing a palm of the wearer's hand, a back portion for facing a back of the wearer's hand, finger portions for receiving fingers of the wearer's hand, and a thumb portion for receiving a thumb of the wearer's hand. The CBRN protective glove comprises a cuff portion for receiving a wrist of the wearer and extending toward a forearm of the wearer. The palm portion is characterized by a level of protection against ingress of noxious agents that is higher than a level of protection against ingress of noxious agents manifested by the back portion. The back portion is characterized by a level of body comfort that is higher than a level of body comfort manifested by the palm portion. The back portion includes, a first area of fibrous material, a second area of fibrous material, and a third area of material that is more stretchable than the fibrous material. The third area extends between the first area and the second area.

According to another aspect of the invention, there is provided an article of personal protective equipment for protecting a wearer against noxious agents. The article of protective equipment comprising a plurality of regions that have different properties and are disposed to cover different parts of a body of the wearer. Each of the regions provides a level of protection against noxious agents. The level of protection against noxious agents of relatively more protective ones of the regions is greater than the level of protection against noxious agents of relatively less protective ones of the regions. The relatively less protective ones of the regions are spaced apart from one another by the relatively more protective ones of the regions.

According to another aspect of the invention, there is provided an article of personal protective equipment for protecting a wearer against noxious agents. The article of protective equipment comprising a plurality of regions that have different properties and are disposed to cover different parts of a body of the wearer. Each of the regions has a noxious fluid penetration resistance and a heat loss capability. The noxious fluid penetration resistance of a first subset of the regions is greater than the noxious fluid penetration resistance of a second subset of the regions. The heat loss capability of the first subset of the regions is less than the heat loss capability of the second subset of the regions. Respective ones of the second subset of the regions are spaced apart from one another by respective ones of the first subset of the regions.

According to another aspect of the invention, there is provided an article of personal protective equipment for protecting a wearer against noxious agents. The article of protective equipment comprising a plurality of regions that have different properties and are disposed to cover different parts of a body of the wearer. A first subset of the regions includes a first material. A second subset of the regions includes a second material different from the first material. The first material and the second material are joined by the first material extending into the second material.

According to another aspect of the invention, there is provided an article of CBRN personal protective equipment comprising a plurality of portions that are disposed to cover different parts of a body of a wearer. One of the portions includes a fibrous material, the fibrous material including fibers defining interstices therebetween. Another of the portions includes an elastomeric membranous material. The fibrous material is jointed to the membranous material along an area of juncture. The fibers of the fibrous material at the area of juncture are embedded in the membranous material.

According to another aspect of the invention, there is provided an article of CBRN personal protective equipment comprising a plurality of portions that are disposed to cover different parts of a body of a wearer. One of the portions includes a fibrous material, the fibrous material including fibers defining interstices therebetween. Another of the portions includes an elastomeric membranous material. The fibrous material is jointed to the membranous material along an area of juncture. The membranous material penetrates within the interstices of the fibrous material in the area of juncture.

According to another aspect of the invention, there is provided an article of CBRN personal protective equipment comprising a portion configured to react to presence of a noxious agent to undergo a change indicative of the presence of the noxious agent.

According to another aspect of the invention, there is provided a CBRN protective headgear for protecting a wearer. The CBRN protective headgear comprises a plurality of regions that have different properties and are disposed to cover different parts of a head of the wearer. A first subset of the regions of the CBRN protective headgear includes a first material. A second subset of the regions of the CBRN protective headgear includes a second material different from the first material. A level of protection against noxious agents of the first material is greater than a level of protection against noxious agents of the second material. A level of body comfort of the second material is greater than a level of body comfort of the first material.

According to another aspect of the invention, there is provided a CBRN protective suit for protecting a wearer. The CBRN protective suit comprises a plurality of regions that have different properties and are disposed to cover different parts of a body of the wearer. A first subset of the regions of the CBRN protective suit includes a first material. A second subset of the regions of the CBRN protective suit includes a second material different from the first material. A level of protection against noxious agents of the first material is greater than a level of protection against noxious agents of the second material. A level of body comfort of the second material is greater than a level of body comfort of the first material.

According to another aspect of the invention, there is provided a CBRN protective footwear for protecting a wearer. The CBRN protective footwear comprises a plurality of regions that have different properties and are disposed to cover different parts of at least one of a foot and a lower leg of the wearer. A first subset of the regions of the CBRN protective footwear includes a first material. A second subset of the regions of the CBRN protective footwear includes a second material different from the first material. A level of protection against noxious agents of the first material is greater than a level of protection against noxious agents of the second material. A level of body comfort of the second material is greater than a level of body comfort of the first material.

These and other aspects of the invention will now become apparent to those of ordinary skill in the art upon review of the following description of embodiments of the invention in conjunction with the accompanying drawings.

BRIEF DESCRIPTION OF THE DRAWINGS

A detailed description of embodiments of the invention is provided below, by way of example only, with reference to the accompanying drawings, in which.

It is to be expressly understood that the description and drawings are only for the purpose of illustrating certain embodiments of the invention and are an aid for understanding. They are not intended to be a definition of the limits of the invention.

DETAILED DESCRIPTION OF EMBODIMENTS

Figure 1:
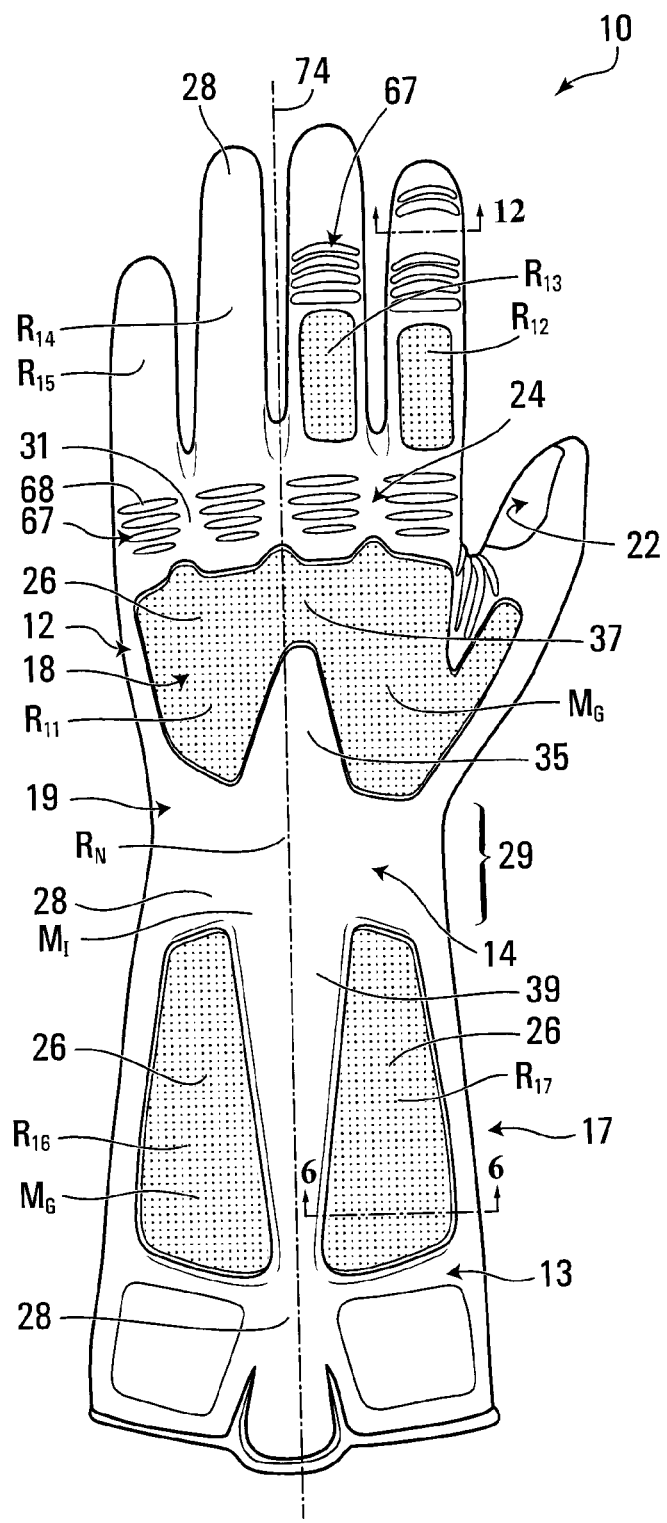
FIGS. 1 to 3 show an example of an article of personal protective equipment, namely a protective glove, in accordance with an embodiment of the invention.
Figure 2:
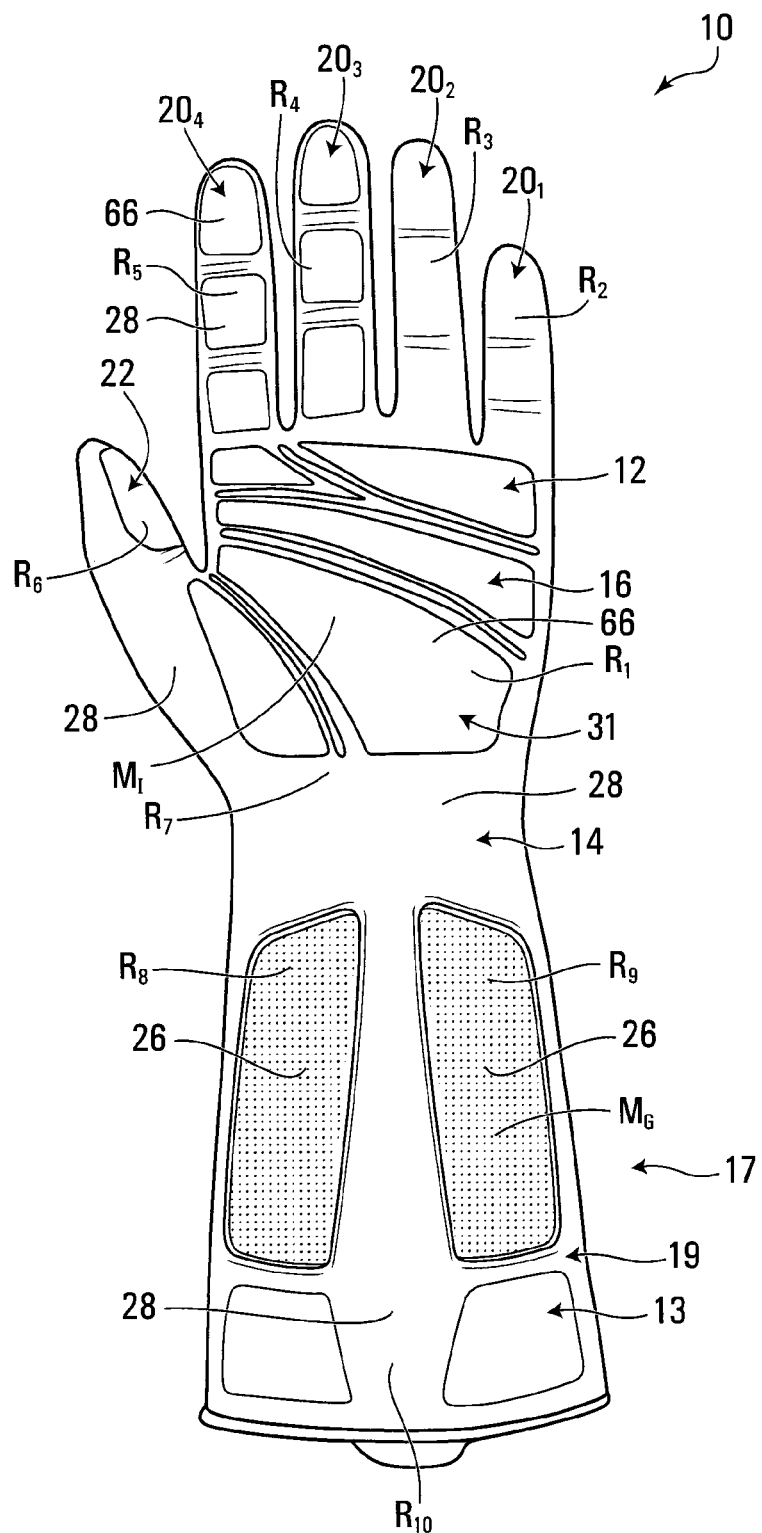
Figure 3:
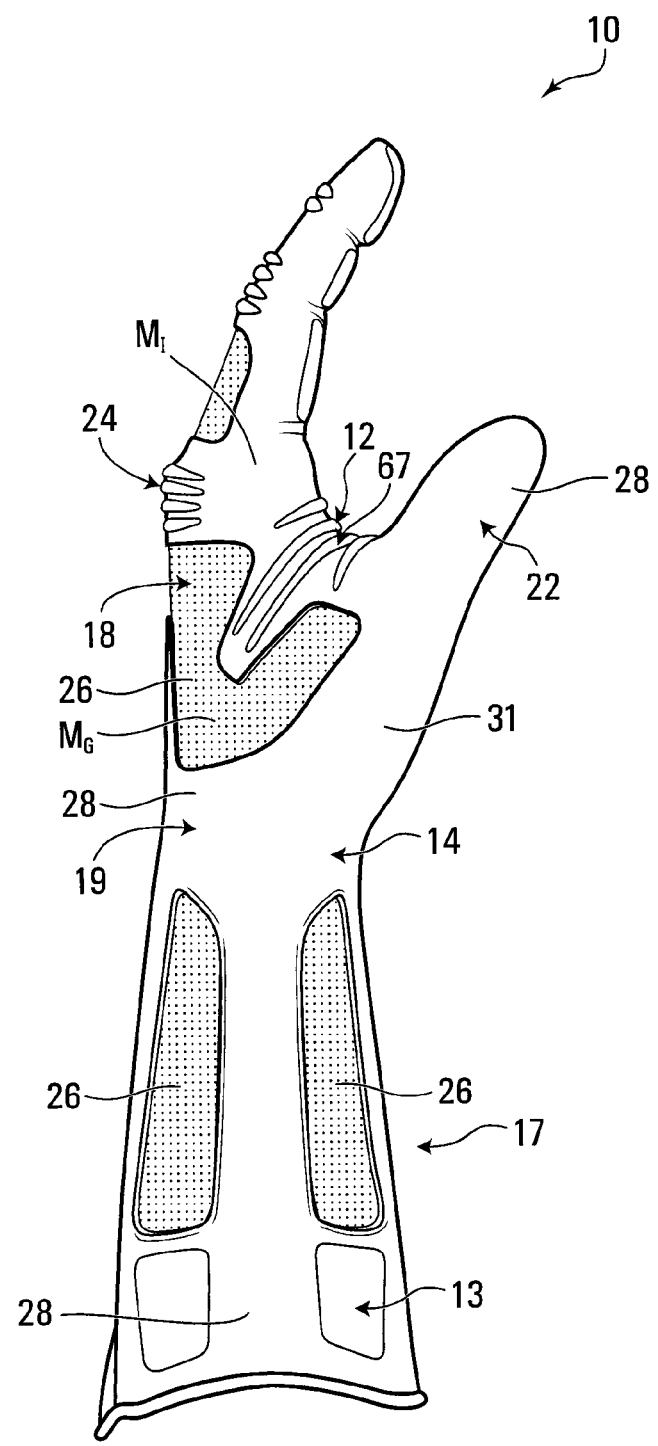

FIGS. 1 to 3 show an example of an article of personal protective equipment 10 wearable by a wearer for protecting the wearer against noxious agents (e.g., chemical agents, biological agents, radiological agents, and/or other poisonous or otherwise harmful agents that can cause disease, injury or death), in accordance with an embodiment of the invention. In this embodiment, the article of personal protective equipment 10 is a glove wearable by the wearer to protect his/her hand from noxious agents. More particularly, in this embodiment, the glove 10 is a chemical, biological, radiological and nuclear (CBRN) protective glove to protect the wearer's hand against a chemical, biological, radiological or nuclear hazard to which the wearer may be exposed.

The glove 10 comprises a hand covering 12 for receiving a hand of the wearer and a cuff 14 for receiving a wrist of the wearer and extending towards a forearm of the wearer. As further discussed later, in this embodiment, the glove 10 is configured to provide selective protection against noxious agents, breathability, heat loss, dexterity, tactility, and/or other functionality in different regions of the glove 10 that cover different parts of the wearer's hand, wrist and/or forearm, thereby allowing the glove 10 to be tailored or optimized in terms of protection, performance and comfort.

The hand covering 12 comprises a palm portion 16 for facing a palm of the wearer's hand, a back portion 18 for facing a back of the wearer's hand, finger portions $20_1$-$20_4$ for receiving fingers of the wearer's hand, and a thumb portion 22 for receiving a thumb of the wearer's hand.

The cuff 14 extends rearwardly from the hand covering 12 to overly the wearer's wrist. The cuff 14 extends towards the wearer's forearm when the glove 10 is worn by the wearer. More particularly, in this embodiment, the cuff 14 comprises a forearm covering 13 to overly the wearer's forearm. The forearm covering 13 may be shorter or longer in other examples of implementation.

Figure 4:
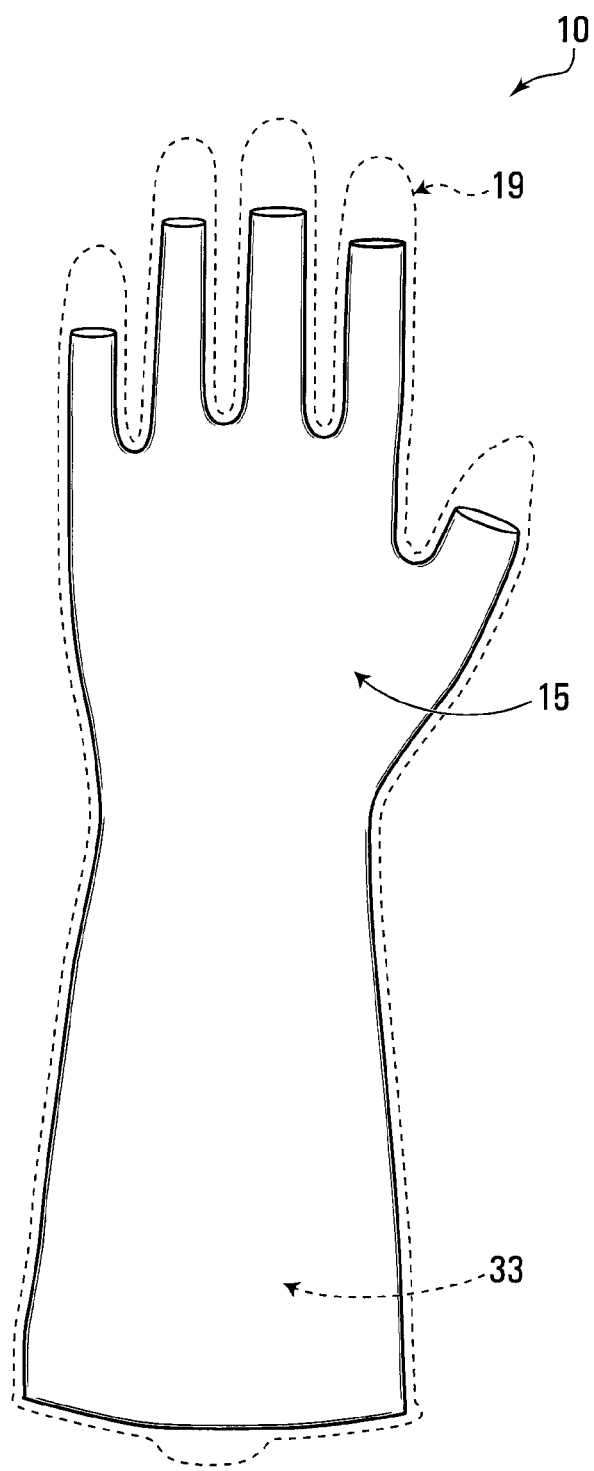
FIG. 4 shows an inner liner of the glove.

In this embodiment, with additional reference to FIG. 4, the glove 10 comprises an outer shell 19 and an inner liner 15 disposed within the outer shell 19. Each of the outer shell 19 and the inner liner 15 comprises respective parts of the hand covering 12 and the cuff 14.

The outer shell 19 includes an external surface 31 of the glove 10 and is directly exposed to and directly interfaces with an environment in which the glove 10 is used. In this example, the outer shell 19 provides a bulk of the glove's protective function, while also providing breathability, dexterity, tactility, and/or other functionality, as further discussed later.

The inner liner 15 includes an internal surface 33 of the glove 10 that contacts the wearer's hand, wrist and forearm. In this example, the inner liner 15 is provided to enhance comfort of the wearer. More particularly, in this example, the inner liner 15 provides moisture management inside the glove 10. For instance, the inner liner 15 may be a wicking liner operable to wick away excess moisture from the wearer's hand, wrist and forearm. The inner liner 15 may be made of any suitable material. For instance, in some embodiments, the inner liner 15 may comprise viscose, polyester and acrylic yarns knitted together either by plating or speckling as disclosed in Canadian Patent 2,385,442 which is hereby incorporated herein by reference.

The glove 10 has different properties in selected regions $R_1$-$R_N$ of the glove 10 that cover different parts of the wearer's hand, wrist and/or forearm to provide different levels of protection against noxious agents, breathability, heat loss, dexterity, tactility, and/or another function in these selected regions. This is achieved by the selected regions $R_1$-$R_N$ of the glove 10 having different structures (e.g., different material compositions, different thicknesses of a common material composition, different surface treatments, etc.).

For example, in some embodiments, a selected region $R_i$ of the glove 10 may have: (1) a higher or lower level of protection against ingress of noxious agents, such as, for instance, a higher or lower noxious fluid penetration resistance (e.g., a higher or lower noxious liquid or gas penetration resistance) or a higher or lower infectious agent penetration resistance (e.g., a higher or lower microorganism penetration resistance for resisting penetration of microorganisms such as viruses, bacteria, prions, fungus or protozoans, that can cause disease); (2) a higher or lower flame resistance; (3) a higher or lower rupture resistance (e.g., a higher or lower cut or puncture resistance); (4) a higher or lower level of body comfort, such as, for instance, a higher or lower heat loss capability or a higher or lower breathability; and/or (5) a higher or lower tactility than another selected region $R_j$ of the glove 10.

For instance, in this embodiment, selected regions $R_1$-$R_6$ of the palm portion 16 and a palm side of the finger portions $20_1$-$20_4$ and the thumb portion 22 of the glove 10 may have a higher level of protection against ingress of noxious agents, such as a higher noxious fluid penetration resistance, than selected regions $R_8$, $R_9$, $R_{11}$-$R_{13}$, $R_{16}$, $R_{17}$ of the back portion 18, a back side of the finger portions $20_3$, $20_4$, and the cuff 14 of the glove 10, which may have a higher level of body comfort, such as a higher heat loss capability or higher breathability than, the selected regions $R_1$-$R_6$ of the palm portion 16 and the palm side of the finger portions $20_1$-$20_4$ and the thumb portion 22, given that the palm portion 16 and the palm side of the finger portions $20_1$-$20_4$ and the thumb portion 22 are more susceptible to directly contact a hazardous liquid or other agent or otherwise apply pressure (e.g., when grasping or otherwise touching an object or when pushing with his/her hand against a ground or other surface) that could tend to induce penetration of a hazardous agent than the back portion 18, the back side of the finger portions $20_1$-$20_4$, and the cuff 14, which may thus increase comfort of the wearer by allowing more heat loss or breathability than the palm portion 16 and the palm side of the finger portions $20_1$-$20_4$ and the thumb portion 22.

Respective ones of the selected regions $R_1$-$R_N$ of the glove 10 that have a higher level of protection than other ones of the selected regions $R_1$-$R_N$ of the glove 10 can be referred to as "relatively more protective" ones of the selected regions $R_1$-$R_N$ of the glove 10, whereas these other ones of the selected regions $R_1$-$R_N$ of the glove 10 can be referred to as "relatively less protective" ones of the selected regions $R_1$-$R_N$ of the glove 10 even though they provide significant protection. Thus, for example, in this embodiment, the selected regions $R_1$-$R_6$ of the palm portion 16 and the palm side of the finger portions $20_1$-$20_4$ and the thumb portion 22 of the glove 10 can be referred to as relatively more protective ones of the selected regions $R_1$-$R_N$ of the glove 10, while the selected regions $R_8$, $R_9$, $R_{11}$-$R_{13}$, $R_{16}$, $R_{17}$ of the back portion 18, the back side of the finger portions $20_3$, $20_4$, and the cuff 14 of the glove 10 can be referred to as relatively less protective ones of the selected regions $R_1$-$R_N$ of the glove 10.

The different levels of protection, breathability, heat loss, dexterity, tactility, etc. in the selected regions $R_1$-$R_N$ of the glove 10 may be implemented in various ways. For example, in some embodiments:

a) The noxious fluid penetration resistance of a selected region $R_i$ of the glove 10 may be a noxious liquid penetration resistance or a noxious gas penetration resistance (which may be an aerosol penetration resistance). The noxious liquid penetration resistance may be measured according to ASTM F739, ASTM F1671, TOP8-2-501, or QSTAG 991. The gas penetration resistance may be measured according to TOP 8-2-501.

A difference in noxious fluid penetration resistance between two selected regions $R_i$, $R_j$ of the glove 10 may take on any suitable value. For example, in some embodiments, a ratio of (i) the noxious liquid penetration resistance of the selected region $R_1$ of the palm portion 16 over (ii) the noxious liquid penetration resistance of the selected region $R_{11}$ of the back portion 18 may be at least 1.1, in some cases at least 1.5, in some cases at least 2, in some cases at least 2.5, in some cases at least 3, and in some cases even more (e.g., 4 or more). As another example, in some embodiments, a ratio of (i) the noxious gas penetration resistance of the selected region $R_1$ of the palm portion 16 over (ii) the noxious gas penetration resistance of the selected region $R_{11}$ of the back portion 18 may be at least 1.1, in some cases at least 1.5, in some cases at least 2, in some cases at least 2.5, in some cases at least 3, and in some cases even more (e.g., 4 or more).

b) The rupture resistance of a selected region $R_i$ of the glove 10 may be a cut resistance or puncture resistance. The cut resistance may be measured according to ASTM F1790. The puncture resistance may be measured according to ASTM F1342.

A difference in rupture resistance between two selected regions $R_i$, $R_j$ of the glove 10 may take on any suitable value. For example, in some embodiments, a ratio of (i) the cut resistance of the selected region $R_{11}$ of the back portion 18 over (ii) the cut resistance of the selected region $R_1$ of the palm portion 16 may be at least 1.1, in some cases at least 1.5, in some cases at least 2, in some cases at least 2.5, in some cases at least 3, and in some cases even more (e.g., 4 or more). As another example, in some embodiments, a ratio of (i) the puncture resistance of the selected region $R_{11}$ of the back portion 18 over (ii) the puncture resistance of the selected region $R_1$ of the palm portion 16 may be at least 1.1, in some cases at least 1.5, in some cases at least 2, in some cases at least 2.5, in some cases at least 3, and in some cases even more (e.g., 4 or more).

c) The infectious agent penetration resistance of a selected region $R_i$ of the glove 10 refers to resisting penetration of microorganisms such as viruses, bacteria, prions, fungus or protozoans, that can cause disease in the wearer. The infectious agent penetration resistance may be measured according to ASTM F1671.

A difference in infectious agent penetration resistance between two selected regions $R_i$, $R_j$ of the glove 10 may take on any suitable value. For example, in some embodiments, the difference may be such that the infectious agent penetration resistance of the selected region $R_1$ of the palm portion 16 passes a test according to ASTM F1671, while the infectious agent penetration resistance of the selected region $R_{11}$ of the back portion 18 fails the test according to ASTM F1671. As another example, in some embodiments, in other tests that are quantifiable, a ratio of (i) the infectious agent penetration resistance of the selected region $R_1$ of the palm portion 16 over (ii) the infectious agent penetration resistance of the selected region $R_{11}$ of the back portion 18 may be at least 1.1, in some cases at least 1.5, in some cases at least 2, in some cases at least 2.5, in some cases at least 3, and in some cases even more (e.g., 4 or more).

d) The flame resistance of a selected region $R_i$ of the glove 10 refers to resisting ignition or melting that can injure the wearer. The flame resistance may be measured according to ASTM F1358 (e.g., an after-flame time or a burn distance)

A difference in flame resistance between two selected regions $R_i$, $R_j$ of the glove 10 may take on any suitable value. For example, in some embodiments, a ratio of (i) the flame resistance of the selected region $R_1$ of the palm portion 16 over (ii) the flame resistance of the selected region $R_{11}$ of the back portion 18 may be at least 1.1, in some cases at least 1.5, in some cases at least 2, in some cases at least 2.5, in some cases at least 3, and in some cases even more (e.g., 4 or more).

e) The heat loss capability of a selected region $R_i$ of the glove 10 refers to a capability of that region of the glove 10 to transfer heat outwardly. The greater the heat loss capability, the more heat can be transferred outwardly. The heat loss capability may be measured according to ASTM F1868 (e.g., total heat loss). For instance, the heat loss capability may be measured according to ASTM F1868 section C.

A difference in heat loss capability between two selected regions $R_i$, $R_j$ of the glove 10 may take on any suitable value. For example, in some embodiments, a ratio of (i) the heat loss capability of the selected region $R_{11}$ of the back portion 18 over (ii) the heat loss capability of the selected region $R_1$ of the palm portion 16 may be at least 1.1, in some cases at least 1.5, in some cases at least 2, in some cases at least 3, in some cases at least 4, in some cases at least 5, in some cases at least 10, in some cases at least 20, and in some cases even more (e.g., 50 or more).

f) The breathability of a selected region $R_i$ of the glove 10 refers to an ability of that region of the glove 10 to allow transmission of air, moisture vapor or other gas therethrough. The breathability may be measured as air permeability according to ASTM D737.

A difference in breathability between two selected regions $R_i$, $R_j$ of the glove 10 may take on any suitable value. For example, in some embodiments, a ratio of (i) the breathability of the selected region $R_{11}$ of the back portion 18 over (ii) the breathability of the selected region $R_1$ of the palm portion 16 may be at least 1.1, in some cases at least 1.5, in some cases at least 2, in some cases at least 2.5, in some cases at least 3, and in some cases even more (e.g., 4 or more).

g) The tactility of a selected region $R_i$ of the glove 10 refers to an ability of that region of the glove 10 to allow the wearer's sense of touch to be used. For example, in some situations, this may be useful to: look for or check a heartbeat, enter text or other inputs on a keyboard (e.g., of a smartphone or other device with small physical buttons), interact with a touch-screen, or otherwise employ a user interface; etc. For instance, the tactility may be measured in terms of a thickness of the selected region $R_i$ of the glove 10.

A difference in tactility between two selected regions $R_i$, $R_j$ of the glove 10 may take on any suitable value. For example, in some embodiments, a ratio of (i) the thickness of the selected region $R_1$ of the palm portion 16 over (ii) the thickness of the selected region $R_{11}$ of the back portion 18 may be at least 1.1, in some cases at least 1.5, in some cases at least 2, in some cases at least 2.5, in some cases at least 3, and in some cases even more (e.g., 4 or more).

In this embodiment, the selected regions $R_1$-$R_N$ of the glove 10 have different material compositions. That is, a material composition of a selected region $R_i$ of the glove 10 is different from a material composition of another selected region $R_j$ of the glove 10. To that end, the selected regions $R_1$-$R_N$ of the glove 10 comprise a plurality of distinct materials $M_1$-$M_G$ having different properties. The distinct materials $M_1$-$M_G$ may belong to different classes or types of materials (e.g., polymers, metals, ceramics, composites, textiles or other fabrics, etc.) and/or may exhibit substantially different values of a given property (e.g., noxious fluid penetration resistance, rupture resistance, infectious agent penetration resistance, heat loss capability, breathability, tactility, etc.).

More particularly, in this embodiment, the selected regions $R_1$-$R_N$ of the glove 10 are regions of the outer shell 19 of the glove 10 and the distinct materials $M_1$-$M_G$ include a membranous material 28 and a fabric material 26.

The membranous material 28 is a material which is or resembles a membrane in that it is thin, pliable, continuous and generally film-like. In this embodiment, the membranous material 28 provides (i) a higher level of protection, notably a higher fluid penetration resistance and a higher microorganism penetration resistance and (ii) a higher tactility than the fabric material 26. The membranous material 28 may be an impermeable material, notably a liquid-impermeable material.

In some embodiments, the membranous material 28 may have a structure that is continuous and imperforate. Typically, this arrangement allows providing the highest level of protection against ingress of hazardous agents due to the absence of fluid pathways.

Alternatively, in other embodiments, the membranous material 28 may have apertures that provide a controlled fluid transfer capability. The size, density and location of the apertures determine the degree of fluid migration capability from the inside of the glove 10 to the outside. In one example of implementation, a perforated membrane may be used at locations of the glove 10 where a fabric material may not be suitable, yet where the fullest degree of protection is not required. The perforations in the membranous material 28 may provide breathability and/or moisture wicking. The perforations may be designed to provide a unidirectional fluid flow, for instance, from the inside out but block or at least impede the flow of fluid in the reverse direction. Examples of such membranous material is described in U.S. Pat. No. 4,151,240 entitled "Method for debossing and perforating a running ribbon of thermoplastic film" issued on Oct. 19, 1976, and hereby incorporated by reference herein.

In this embodiment, the membranous material 28 is a polymeric material in a sheet-like form. The polymeric material 28 may be any suitable polymer (e.g., thermoplastic or thermoset polymer).

More particularly, in this embodiment, the polymeric material 28 is an elastomeric material. The elastomeric material 28 can be any polymeric material with suitable elasticity. For instance, in some embodiments, the elastomeric material 28 may be a thermoplastic elastomer (e.g., a fluorinated thermoplastic elastomer or any other thermoplastic elastomer) or a thermoset elastomer (e.g., a fluorinated thermoset elastomer or any other thermoset elastomer). In this example of implementation, the elastomeric material 28 is a rubber material. More specifically, in this example, the rubber material 28 is butyl rubber. Any other suitable rubber compound may be used in other examples (e.g., natural rubber, butadiene rubber, styrene butadiene rubber, halogenated butyl rubber, etc.). Also, in other examples of implementation, the elastomeric material 28 may be another elastomer instead of rubber (e.g., a polyurethane elastomer, an ethylene elastomer, a propylene elastomer, a nitrile elastomer, an epichlorohydrin elastomer, a polychloroprene elastomer, an ethylene acrylic elastomer, a tetrafluoroethylene elastomer, a tetrafluoropropylene elastomer, a fluoroelastomer, a perfluoroelastomer, etc.).

In other embodiments, the membranous material 28 may be a polymeric non-elastomeric material or any other suitable polymeric material (e.g., polyethylene, polyamide, polypropylene, polyvinyl chloride, chlorosulphonated polyethylene, chlorinated polyethylene, polyacrylate, polysulfide, silicone, fluorosilicone, etc.).

In this example of implementation, respective ones of the selected regions $R_1$-$R_N$ of the glove 10 that are made of the rubber material 28 are imparted their shape during a molding process used to manufacture the glove 10, as further discussed below.

Figure 12:
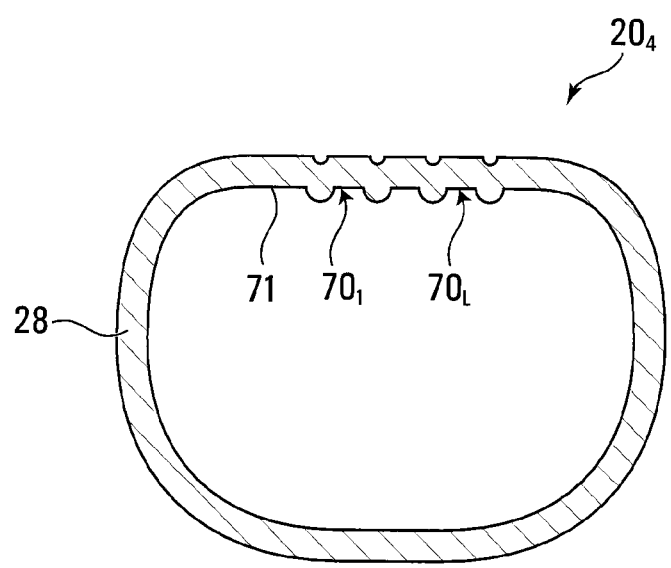
FIG. 12 shows a cross-sectional view of a finger portion of the glove.

Respective ones of the selected regions $R_1$-$R_N$ of the glove 10 that are made of the rubber material 28 may have structural features to enhance grip, flexion, integration with other protective equipment (e.g., to attach and/or seal with a sleeve of a protective suit), and/or other functions. For example, in this embodiment, regions of the palm portion 16 and the finger portions $20_3$, $20_4$ made of the rubber material 28 comprise a textured area 66 to improve grip, while regions corresponding to flex areas of the wearer's hand, such as metacarpal or phalangeal joints, comprise a flexion facilitator 67. In this case, the flexion facilitator 67 includes a plurality of ridges 68 forming a baffle. Also, in this embodiment, with additional reference to FIG. 12, regions of the finger portions $20_3$, $20_4$ or other parts of the glove 10 that are made of the rubber material 28 comprise inner channels $70_1$-$70_C$ formed by an inner surface 71 of the rubber material 28 to facilitate air flow inside the glove 10, including to and from the fabric material 26 (e.g., particularly when the wearer's fingers are flexed).

The fabric material 26, which may also be referred to as a fibrous material or textile material, is a thin pliable material comprising natural or synthetic fibers that may form elongated fabric/textile elements, such as filaments, strands or yarns, and that have been combined by weaving, knitting, interlacing, felting, or otherwise crossing or entangling them. A fabric of the fabric material 26 can be a woven fabric or a non-woven fabric. In this example of implementation, the fabric material 26 provides comfort-enhancing properties to the glove 10, such as enhanced heat loss, breathability and moisture management, while affording certain protective features (e.g., protection against aerosol agents, etc.). More particularly, in this example of implementation, the fabric material 26 provides a higher heat loss capability or higher breathability than the rubber material 28.

In some embodiments, the fabric material 26 may comprise one or more plies of woven fabric, one or more plies of nonwoven fabric, and/or one or more plies of any other textile. The fibers, filaments, strands, yarn or other elongated fabric/textile elements of the fabric material 26 may be made of any suitable substance (e.g., polyester, nylon, spandex (elastane), or any other polymer, or blends of thereof).

Figure 5:
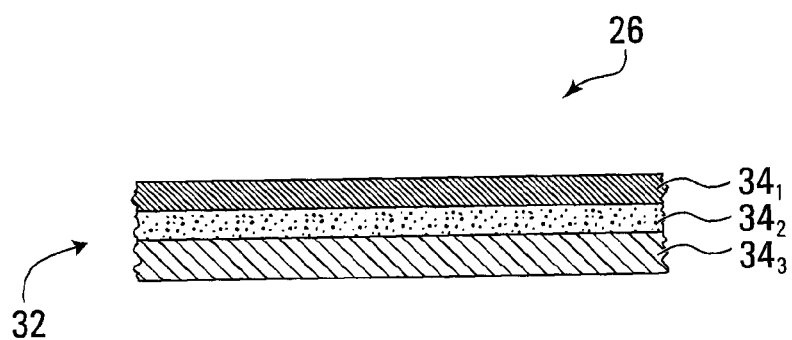
FIG. 5 shows a fabric material of the glove.

In this embodiment, with additional reference to FIG. 5, the fabric material 26 comprises a fabric laminate 32 comprising a plurality of layers $34_1$-$34_3$ that includes at least one layer of fabric. More specifically, in this embodiment, the fabric laminate 32 comprises an outer layer $34_1$, an intermediate layer $34_2$, and an inner layer $34_3$.

The outer layer $34_1$ of the fabric laminate 32 may provide desirable mechanical properties such as puncture and cut resistance and may further provide flame resistance as well as oil and lubricant resistance. In this embodiment, the outer layer $34_1$ is a fabric layer. More particularly, in this embodiment, the outer layer $34_1$ comprises an aramid-based fabric. In other embodiments, the outer layer 34 may comprise any other suitable fabric.

The intermediate layer $34_2$ of the fabric laminate 32 may act as an aerosol barrier by providing protection against aerosol-borne biological agents and aerosolized chemical agents. In this embodiment, the intermediate layer $34_2$ is a non-fabric layer (i.e., a layer of material other than fabric). More particularly, in this embodiment, the intermediate layer $34_2$ is a breathable membrane. For example, in some embodiments, the intermediate layer 34 may be a polytetrafluoroethylene (PTFE) and/or polyurethane (PU) semipermeable membrane. In other embodiments, the intermediate layer $34_2$ may be a fabric layer.

The inner layer $34_3$ of the fabric laminate 32 may provide protection against chemical substances (e.g., chemical weapon agents (CWA) and toxic industrial chemicals (TICs)). In this embodiment, the inner layer $34_3$ is a fabric layer comprising a fabric in which active particles are distributed. The active particles are "active" in that they have a property allowing them to induce a chemical and/or physical reaction in response to a stimulus at their surface. In this example, the active particles have an adsorptive property that causes them to adsorb contaminants or other noxious agents. More particularly, in this example, the active particles are microporous particle each including a multitude of pores (e.g., several thousands of pores) which can trap the contaminants or other noxious agents.

The active particles of the inner layer $34_3$ may be implemented in any suitable way. In this embodiment, the active particles comprise activated carbon. The activated carbon may be produced in various known ways (e.g., from carbonaceous materials such as wood, nutshells, coconut husk, coir, peat, lignite, coal, or other carbonaceous substances using known processes (e.g., physical reactivation using hot gases which involves carbonization and/or oxidation, or chemical activation using chemicals on raw material prior to carbonization), or synthetically using known processes (e.g., pyrolysis of polystyrene beads)). In other embodiments, the active particles may comprise activated alumina (aluminum oxide), silica gel, soda ash, aluminum trihydrate, baking soda, cinoxate (p-methoxy-2-ethoxyethyl ester cinnamic acid), zinc oxide, zeolites, titanium dioxide, or any other suitable material.

The fabric laminate 32 of the fabric material 26 may be implemented in various other ways in other embodiments. For example, in some embodiments, the fabric laminate 32 may comprise two layers instead of three, or more three layers. In other embodiments, the fabric laminate 32 may not be implemented at all, but rather the fabric material 26 may comprise a single layer.

In this embodiment, a selected region $R_i$ of the glove 10 and another selected region $R_j$ of the glove 10 that include the fabric material 26 are spaced apart from one another by an intermediate selected region $R_k$ of the glove 10 that includes the rubber material 28 and is located between the selected regions $R_i$, $R_j$ of the glove 10. The selected regions $R_i$, $R_j$ of the glove 10 which include the fabric material 26 are therefore isolated from one another by the intermediate selected region $R_k$ of the glove 10 that includes the rubber material 28. Notably, in this example, the selected regions $R_i$, $R_j$ of the glove 10 which include the fabric material 26 form "islands" of the fabric material 26 that are isolated from one another and surrounded by adjacent selected regions of the glove 10 that include the rubber material 28. This may provide greater freedom and precision in tailoring or optimizing the glove 10 in terms of protection, comfort and performance.

For example, in this embodiment, the selected regions $R_8$, $R_9$, $R_{11}$, $R_{12}$, $R_{13}$, $R_{16}$, $R_{17}$ of the glove 10 include the fabric material 26 and are spaced apart from one another by intermediate selected regions of the glove 10 that include the rubber material 28 and that are located between respective ones of the selected regions $R_8$, $R_9$, $R_{11}$, $R_{12}$, $R_{13}$, $R_{16}$, $R_{17}$ of the glove 10. As such, the selected regions $R_8$, $R_9$, $R_{11}$, $R_{12}$, $R_{13}$, $R_{16}$, $R_{17}$ of the glove 10 form islands of the fabric material 26 that are isolated from one another and surrounded by adjacent selected regions of the glove 10 that include the rubber material 28.

In some examples of implementation, the fabric material 26 in selected regions $R_i$, $R_j$ of the glove 10 that are spaced apart from one another by an intermediate selected region $R_k$ of the glove 10 that includes the rubber material 28 may be separate pieces of fabric material 26 that are distinct and separate from one another. For instance, in this embodiment, the fabric material 26 in each of the selected regions $R_9$, $R_{11}$, $R_{12}$, $R_{13}$ is a separate piece of fabric material.

In other examples of implementation, the fabric material 26 in selected regions $R_i$, $R_j$ of the glove 10 that are spaced apart from one another by an intermediate selected region $R_k$ of the glove 10 that includes the rubber material 28 may constitute a single piece of fabric material 26. For instance, in this embodiment, the fabric material 26 in the selected region $R_8$ of the glove 10 and the fabric material 26 in the selected region $R_9$ of the glove 10 are part of a single piece of fabric material, with the rubber material 28 of the selected region $R_{10}$ of the glove 10 overlying a central part of that single piece of fabric material between the selected regions $R_8$, $R_9$ of the glove 10 such that this central part of the single piece of fabric material is covered by the rubber material 28 and concealed (i.e., not readily visible) at the external surface 31 of the glove 10.

In some embodiments, the fabric material 26 in a selected region $R_i$ of the glove 10 and the fabric material 26 in another selected region $R_j$ of the glove 10 may be substantially identical in composition (e.g., the same fabric laminate). Alternatively, in other embodiments, the fabric material 26 in a selected region $R_i$ of the glove 10 may be different from the fabric material 26 in another selected region $R_j$ of the glove 10. For instance, in some examples of implementation, the fabric material 26 in each of the selected regions $R_8$, $R_9$, $R_{16}$, $R_{17}$ of the cuff 14 may be different from, such as more breathable or allowing more heat loss than, the fabric material 26 in each of the selected regions $R_{11}$-$R_{13}$ of the back portion 18 and the back side of the finger portions $20_3$, $20_4$, which may provide more protection (e.g., more noxious liquid or gaseous penetration resistance) than the selected regions $R_8$, $R_9$, $R_{16}$, $R_{17}$ of the cuff 14, given that the back portion 18 and the back side of the finger portions $20_3$, $20_4$ may be more likely to contact or otherwise be exposed to hazardous agents or be damaged during use. For example, in some embodiments, the fabric laminate 32 of the fabric material 26 in each of the selected regions $R_8$, $R_9$, $R_{16}$, $R_{17}$ of the cuff 14 may be different from, such as have a different number of layers and/or different materials in one or more of its layers than, the fabric laminate 32 of the fabric material 26 in each of the selected regions $R_{11}$-$R_{13}$ of the back portion 18 and the back side of the finger portions $20_3$, $20_4$.

By having the fabric material 26 and the rubber material 28 in the selected regions $R_1$-$R_N$ of the glove 10, a useful combination of properties selectively located throughout different portions of the glove 10 can be achieved. For example, the rubber material 28 may be located at portions of the glove 10 more susceptible to be exposed to hazardous agents when in use. For instance, the palm portion 16 of the glove 10 is more susceptible to undergo noxious liquid penetration due to its greater potential to directly contact noxious agents and has a higher likelihood of having pressure applied to it due to, for example, interaction with work surfaces and/or implements. The finger portions $20_1$-$20_4$ and thumb portion 22 are also more susceptible to come into contact with agents, and moreover can benefit from enhanced tactility and dexterity to the wearer's fingers and thumb. The fabric material 26 may be located at portions of the glove 10, such as the back portion 18 and the cuff 14, which are less susceptible to be exposed to hazardous agents or subject to high pressure during use, and thus used to provide enhanced heat loss and breathability to improve comfort of the wearer.

In addition to providing differential protection and other properties, in this embodiment, the selected regions $R_1$-$R_N$ of the glove 10 are configured to impart an ergonomic fit to the glove 10 and to facilitate donning and doffing of the glove 10.

For instance, in this embodiment, the glove 10 is provided with a variable stretchability profile that facilitates the placement of the glove 10 on the wearer's hand and the removal of the glove 10 from the wearer's hand. With reference to FIG. 1, the glove 10 has a longitudinal axis 74 (the dashed line 74 materializes the longitudinal axis of the glove 10). A variable stretchability profile along the longitudinal axis 74 of the glove 10 means that at different points or locations along the longitudinal axis 74 the glove will be more or less easy to stretch. The variable stretchability profile allows tailoring the fit of the glove 10 in order to provide more stretch in areas that tend to expand more when the wearer's hand is inserted in the glove 10 or removed therefrom, while providing less stretchability in areas that typically do not stretch as much either in use or when the glove 10 is put on or off.

The area of the glove 10 which typically needs to stretch the most is the area 29 that is located at the base of the wrist. The area 29 is designed as a tightfitting area (e.g., a constriction or "throat") in order to create a seal preventing entry inside the glove 10 of noxious substances in addition to securing the glove to the wearer's hand and preventing it from slipping from the hand accidentally. In the form of construction of the glove 10 described earlier, which uses a combination of rubber and fabric materials, a selective stretchability profile can be accomplished by designing the glove 10 such that the areas where more stretchability is desired uses more of the rubber material 28, which is more stretchable than the fabric material 26.

In this example of implementation, the distribution of the rubber material 28 and the fabric material 26 is such that (i) the island of fabric material $R_{11}$ and (ii) the islands of fabric material $R_{16}$ and $R_{17}$ are separated by a continuous and uninterrupted zone of the rubber material 28 that coincides with the area 29. The zone of rubber material 28 thus forms a continuous band that encircles the base of the wrist providing the desired degree of stretchability yet providing a sufficiently tight fit for protection against ingress of foreign material and also firm attachment to the hand.

Variants are possible in other embodiments. For example, in some embodiments, instead of providing the glove 10 with an uninterrupted zone of rubber material in the area 29, inserts of fabric material can be used if the nature of the rubber material is such that the remaining rubber will still be able to provide the desired degree of stretchability.

To further facilitate the placement of the glove 10 on the wearer's hand, the island of fabric material $R_{11}$ is provided with a recessed portion 35, which forms in the island $R_{11}$ two adjacent sections which are joined by a narrow bridge 37 allowing the two sections to open up as the wearer inserts his/her hand in the glove 10. In this case, the recess 35 has a variable transverse dimension, being largest in the location which is adjacent the area 29. This allows providing more stretchability closest to the area 29 which is the narrowest region.

Similarly, the islands $R_{16}$ and $R_{17}$ of fabric material are separated by a continuous and tapering band 39 of rubber material allowing the islands $R_{16}$ and $R_{17}$ to move apart as the wearer inserts his/her hand in the glove 10. As with the recess 35, the band 39 has its largest transverse dimension adjacent the area 29 to provide more flexibility in the narrowest region.

More generally, increased stretchability in the area 29 can be achieved by controlling the ratio between the surface area of rubber material and the surface area of fabric material at different positions on the longitudinal axis 74 of the glove 10. At the position corresponding to the area 29, the ratio should be higher than at the position that is generally above the area 29 and which corresponds to the base of the thumb and above. Similarly, the ratio in the area 29 should be higher than at the position which is below the area 29 that corresponds to portions of the glove 10 which progressively taper out from the area 29.

Figure 13:
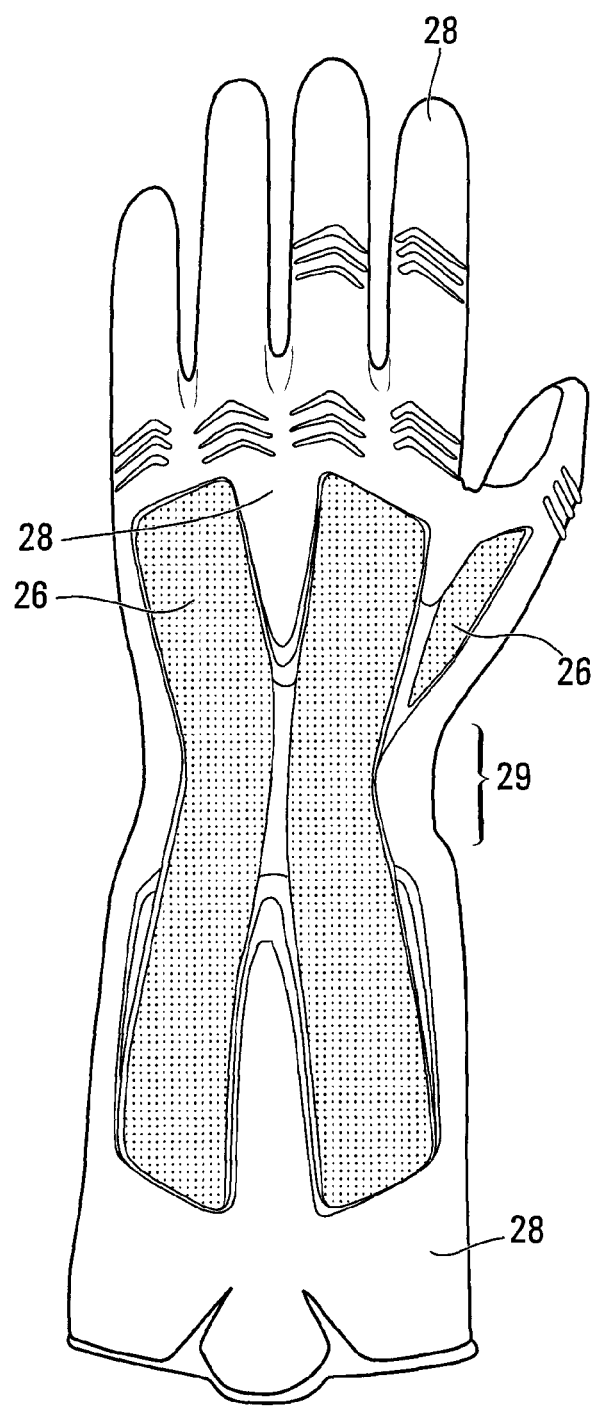
FIGS. 13 to 19 show variants of the glove in accordance with other embodiments of the invention.

FIG. 13 illustrates yet another example of implementation of the glove 10 having a variable stretchability profile along its longitudinal axis 74. In this example, the glove 10 has islands of the fabric material 26 which extend side-by-side along the longitudinal axis 74 of the glove 10. The islands of the fabric material 26 form elongated bands that extend across the area 29. The distance between the bands varies to alter the ease with which the bands can be pulled away one from the other as the wearer's inserts his/her hand in the glove 10. The distance, hence the amount of rubber material between the bands of the fabric material 26, varies from a maximum to a minimum, which is located in the area 29. To the extent that the amount of rubber material between the bands 26 in the area 29 does not allow sufficient degree of stretchability to comfortably put the glove 10 or remove it from the hand, the amount of fabric material placed elsewhere in the area 29 can be limited or eliminated altogether such that a sufficient amount of rubber material for the desired degree of stretch is available.

The glove 10, including its selected regions $R_1$-$R_N$ with different properties, may be manufactured in any suitable way. Notably, in this embodiment, the distinct materials $M_1$-$M_G$, including the rubber material 28 and the fabric material 26 in this case, may be interconnected in any suitable manner.

Figure 6:
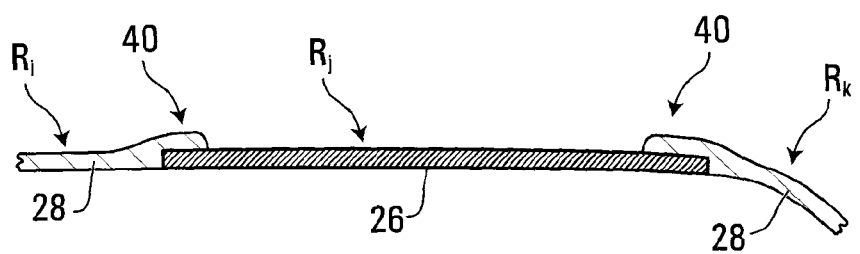
FIG. 6 shows regions of the glove made of distinct materials that are interconnected.

With additional reference to FIG. 6, there is a joint 40 (i.e., an area of juncture) between the rubber material 28 and the fabric material 26 of adjacent regions $R_i$, $R_j$ of the glove 10. In this embodiment, the joint 40 is a mechanical interlock in which the rubber material 28 and the fabric material 26 of the adjacent regions $R_i$, $R_j$ of the glove 10 are mechanically interlocked. That is, the rubber material 28 and the fabric material 26 of the adjacent regions $R_i$, $R_j$ of the glove 10 are interconnected via the rubber material 28 extending into the fabric material 26 to create the joint 40 between these materials. As such, in this embodiment, the joint 40 is stitchless, i.e., does not have stitches required to hold the rubber material 28 and the fabric material 26 of the adjacent regions $R_i$, $R_j$ of the glove 10.

Figure 7:
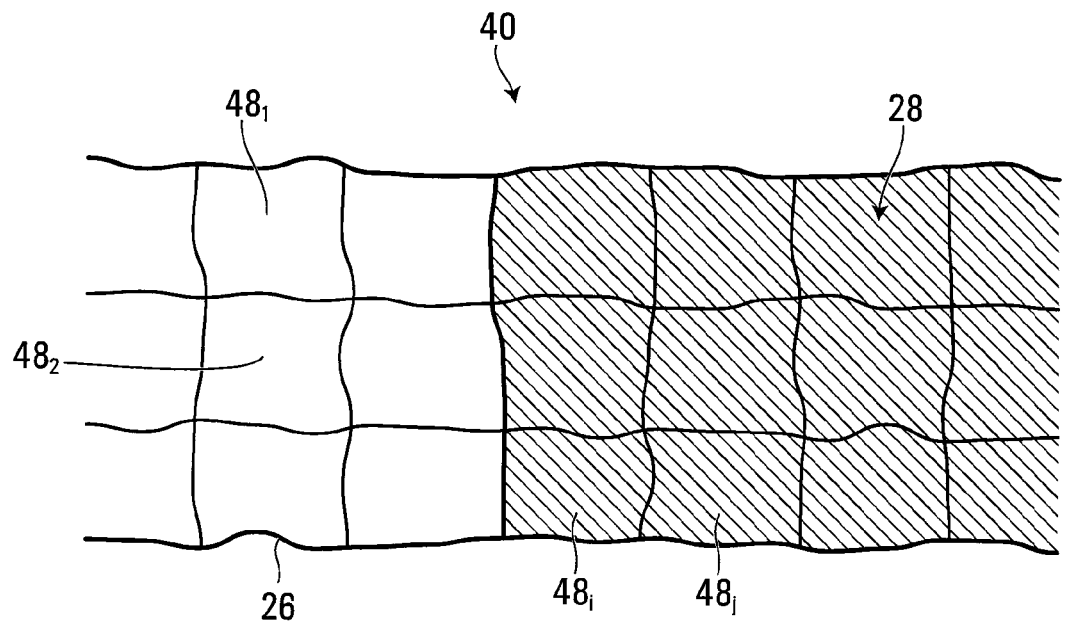
FIGS. 7 and 8 show a joint between the distinct materials.
Figure 8:
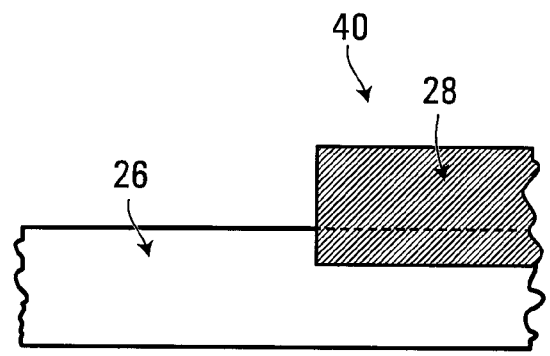

More particularly, in this embodiment, the glove 10 is manufactured using an overmolding process in which the rubber material 28 is overmolded onto the fabric material 26 such that the joint 40 between the rubber material 28 and the fabric material 26 of the adjacent regions $R_i$, $R_j$ of the glove 10 is an overmolded joint. That is, the rubber material 28 of the region $R_i$ of the glove 10 is overmolded onto the fabric material 26 of the region $R_j$ of the glove 10 to form the joint 40. With additional reference to FIGS. 7 and 8, during the overmolding process, the rubber material 28 flows into interstices $48_1$-$48_I$ of the fabric material 26 (i.e., spaces between fibers, which may be spaces between fibers of adjacent strands, yarns, or other elongated fabric elements, of the fabric material 26) where it is captured to mechanically interlock the rubber material 28 and the fabric material 26 at the joint 40.

The rubber material 28 may penetrate to any suitable depth within the fabric material 26. For example, in some embodiments, the rubber material 28 may flow to a depth corresponding to at least 10% of a thickness of the fabric material 26, in some cases at least 20% of the thickness of the fabric material 26, in some cases at least 30% of the thickness of the fabric material 26, in some cases at least 40% of the thickness of the fabric material 26, in some cases at least 50% of the thickness of the fabric material 26, and in some cases even deeper. In some cases, the rubber material 28 may pass completely through a fabric layer of the fabric material 26, such as, in this example, the outer fabric layer $34_1$ of the fabric laminate 32 (e.g., before stopping at the membrane $34_2$).

To enhance the mechanical integration between the rubber material 28 and the fabric material 26, in some embodiments, additional anchoring points can be created in the fabric material 26 by forming recesses, such as apertures, in which the rubber material 28 flows and, upon setting, provides added retention. Anchoring points can also be achieved by forming projections on the surface of the fabric material 26 that embed themselves in the rubber mass during the molding operation. Alternatively or additionally, in some embodiments, a surface treatment (e.g., a primer, a corona plasma treatment, etc.) may be applied to the fabric material 26 to enhance bonding.

Figure 9:
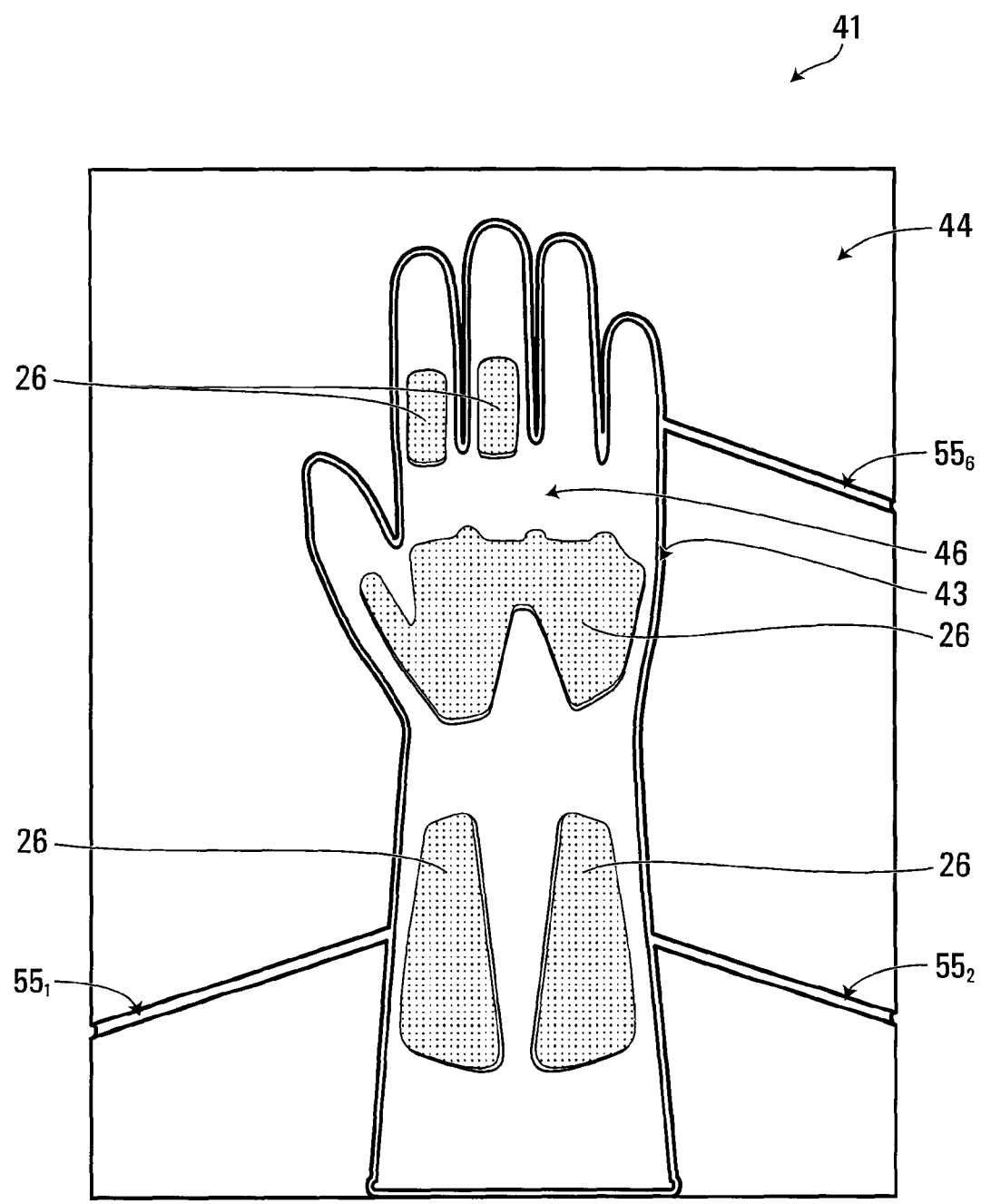
FIG. 9 shows a mold used in a method of manufacturing the glove.
Figure 10:
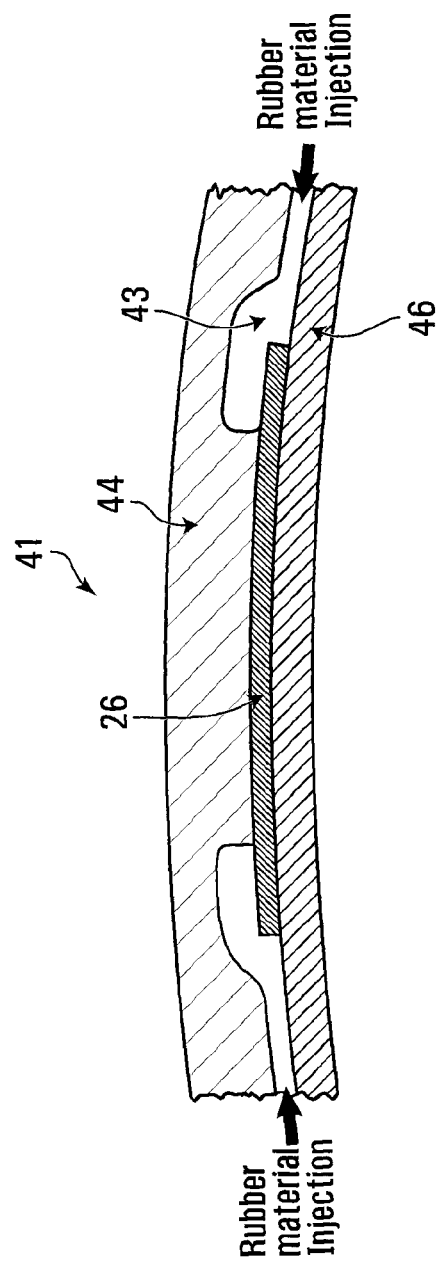
FIG. 10 shows part of the mold where the distinct materials of the glove are to be interconnected.

For instance, with further reference to FIGS. 9 and 10, the overmolding process employed in manufacturing the glove 10 utilizes a mold 41 including a cavity 43 which defines a shape of the glove 10. In this embodiment, the mold 41 comprises an outer mold member 44 and an inner mold member 46 which define the cavity 43 between them. The inner mold member 46, which is a hand form, is placed within the outer mold member 44. The fabric material 26 is positioned at selected locations on the inner mold member 46 corresponding to the regions $R_8$, $R_9$, $R_{11}$-$R_{13}$, $R_{16}$, $R_{17}$ of the back portion 18, the back side of the finger portions $20_3$, $20_4$, and the cuff 14 of the glove 10. With the inner mold member 46 placed within the outer mold member 44, the mold 41 is closed and sealed shut and the rubber material 28 is injected into the cavity 43 of the mold 41 via injection ports $55_1$-$55_G$ (sometimes referred to as "gates") in a fluid state such as to (i) form respective ones of the regions $R_1$-$R_N$ of the glove 10 that are made of the rubber material 28 and (ii) overlap edge portions of the fabric material 26 on the inner mold member 46 at locations corresponding to the regions $R_8$, $R_9$, $R_{11}$-$R_{13}$, $R_{16}$, $R_{17}$ of the glove 10 that are made of the fabric material 26. This allows the rubber material 28 to enter the interstices $48_1$-$48_I$ of the fabric material 26, effectively creating the joint 40 between the rubber material 28 and the fabric material 26.

Figure 11:
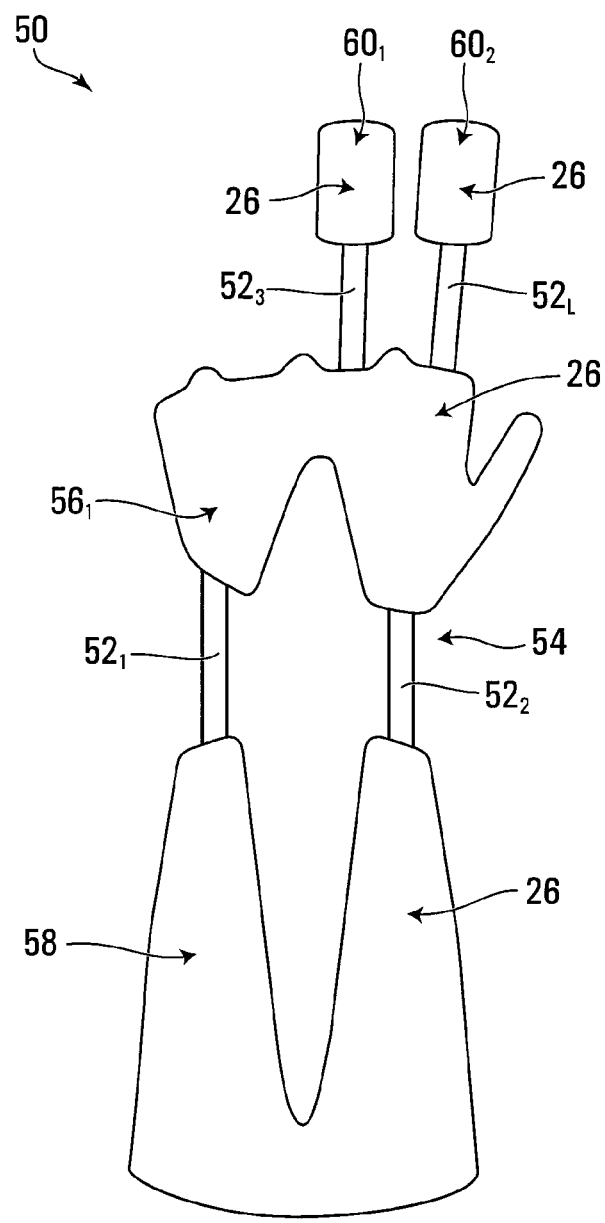
FIG. 11 shows a variant wherein a plurality of pieces of the fabric material are connected via a webbing.

In a variant of the overmolding process, with further reference to FIG. 11, instead of individually placing separate pieces of the fabric material 26 onto the inner mold member 46, the overmolding process may employ a pre-assembled construction 50 comprising links $52_1$-$52_L$ interconnecting a plurality of pieces of the fabric material 26. The pieces of the fabric material 26 are arranged in the pre-assembled construction 50 such as to be positioned at the selected locations corresponding to the regions $R_8$, $R_9$, $R_{11}$-$R_{13}$, $R_{16}$, $R_{17}$ of the back portion 18, the back side of the finger portions $20_3$, $20_4$, and the cuff 14 of the glove 10 when the pre-assembled construction 50 is placed on the inner mold member 46. The links $52_1$-$52_L$ interconnecting the pieces of the fabric material 26 effectively form a webbing 54. For example, the pre-assembled construction 50 may comprise a back piece 56, a cuff and forearm piece 58, and finger pieces $60_1$, $60_2$ of the fabric material 26. The webbing 54 connects the back piece 56, the cuff and forearm piece 58 and the finger pieces $60_1$, $60_2$. The pre-assembled construction 50 is positioned on the inner mold member 46 which is then placed within the outer mold member 44. The rubber material 28 is then injected into the mold 41 in a fluid state such as to envelop the pre-assembled construction 50 at joint locations. In some embodiments, the webbing 54 may be disintegrable at a molding temperature $T_m$. For example, once the temperature of the webbing 54 reaches the molding temperature $T_m$, the webbing 54 disintegrates, effectively leaving behind the pieces of the fabric material 26 at their selected locations. In other embodiments, the webbing 54 may not disintegrate and remains encased within the rubber material 28.

Figure 20:
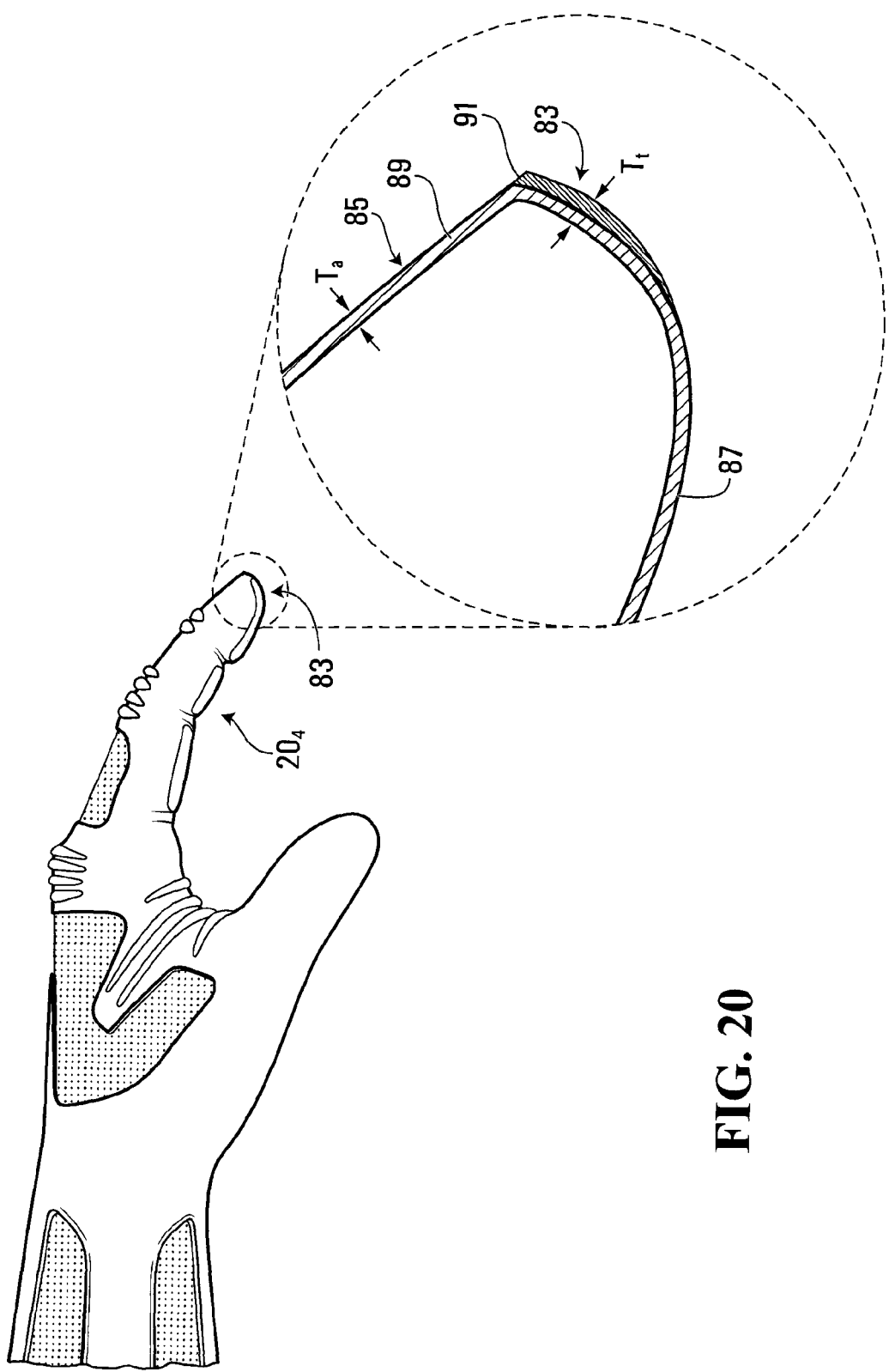
FIG. 20 shows a fingertip part of the glove.

In this embodiment, the finger portions $20_1$-$20_4$ and the thumb portion 22 may be configured to enhance prehension or other aspects of dexterity when wearing the glove 10. Notably, in this embodiment, with additional reference to FIG. 20, a fingertip part 83 of a given one of the finger portions $20_1$-$20_4$ and the thumb portion 22 is configured to enhance dexterity. To that end, in this example, the fingertip part 83 is reinforced.

More particularly, in this embodiment, an end portion 91 of the fingertip part 83 is thicker than an adjacent portion 85 of the fingertip part 83. The adjacent portion 85 of the fingertip part 83 includes a palm-side portion 87 and a backside portion 89 of the fingertip part 83. For example, in some embodiments, a ratio of (i) a thickness $T_t$ of the end portion 91 of the fingertip part 83 over (ii) a thickness $T_a$ of the adjacent portion 85 of the fingertip part 83 may be at least 1.1, in some cases at least 1.2, in some cases at least 1.3, in some cases at least 1.4, in some cases at least 1.5, and in some cases even more (e.g., 2 or more).

In this example, the end portion 91 of the fingertip part 83 which is thicker is located closer to the backside portion 89 of the fingertip part 83 than to the palm-side portion 87 of the fingertip part 83 (i.e., closer to a fingernail of the wearer's finger or thumb).

Also, in this example, the fingertip part 83 is jointless. That is, the fingertip part 83 does not have a joint (e.g., a seam) that interconnects different areas of the fingertip part 83. Thus, thickening of the fingertip part 83 is by design, not as a result of a manufacturing constraint or artifact. In this embodiment, this jointless nature of the fingertip part 83 is achieved during molding of the glove 10.

In this example, the thickened fingertip part 83 is achieved by having more of the rubber material 28. In other examples of implementation, the fingertip part 83 may comprise layer of material different from the rubber material 28 to be thickened.

Applications of the glove 10 may exist where certain coloring or pattern needs to be placed on the external surface 31 of the glove 10. For example, in some embodiments, when the glove 10 is used in military applications, a camouflage pattern is customarily applied on its external surface 31. In this embodiment, where the glove 10 uses two different kinds of materials, namely the rubber material 28 and the fabric material 26, the application of the camouflage pattern over the entire glove becomes more complicated because different application processes are necessary, one for each kind of material. In the case of the fabric material 26, the pattern can be printed in the customary fashion before the overmolding operation. In such case, the printed fabric is introduced in the mold and the rubber material 28 is injected, as discussed above. The glove 10 thus has a camouflage pattern on the areas where the fabric material 26 is present and visible. In some cases, to the extent it is desired and/or necessary, a camouflage or other pattern can be applied on the rubber material 28 by using any suitable process. In many practical applications, the nature of the rubber material 28 may be such that its color is dark and inherently visually disguising, which obviates the need for any coloring or printing of the rubber.

The glove 10 may be configured and/or made in any other suitable ways in other embodiments.

For example, while in this embodiment the glove 10 is manufactured through an injection molding process, in other embodiments, the glove 10 may be manufactured through a compression molding process, a transfer molding process, a vacuum molding process or any other suitable molding process.

As another example, rather than being an overmolded joint resulting from an overmolding process, the joint 40 between the rubber material 28 and the fabric material 26 of adjacent regions $R_i$, $R_j$ of the glove 10 may be implemented in various other ways. For instance, in other embodiments, the rubber material 28 and the fabric material 26 of adjacent regions $R_i$, $R_j$ of the glove 10 may be joined via ultrasonic welding, adhesive bonding, stitching, or any other suitable fastening procedure. The joint 40 may thus comprise a weld, an adhesive, a stitch, or any other suitable fastener. In such embodiments, the rubber material 28 may be first molded on its own without integrating the fabric material 26. Openings to receive pieces of the fabric material 26 may be provided at proper locations (e.g., by designing the mold 41 accordingly, or by cutting or otherwise making these openings after molding of the rubber material 26).

As yet another example, instead of or in addition to having different material compositions to provide their different properties, the selected regions $R_1$-$R_N$ of the glove 10 may have different thicknesses. For instance, in some embodiments, the rubber material 28 may be made thicker at selected locations of the glove 10 (e.g., thicker in the palm portion 16 than at a fingertip area of the finger portions $20_1$-$20_4$) in order to increase the level of protection accorded to the wearer.

As yet another example, in addition to providing comfort-enhancing features, in some embodiments, the fabric material 26 may further provide a noxious agent detector. For instance, where an interaction with a hazardous agent is possible, the wearer may desire to be aware when such interaction occurs. To this end, the hazardous agent detector is operable to react to presence of a targeted agent or a plurality of targeted agents. For example, the hazardous agent detector may undergo a change in color when in the presence of the targeted agent or agents.

The wearer may thus observe the change in color of the fabric material 26 to be aware of the targeted agent or agents' presence. The noxious agent detector may be implemented by agent-detecting additive added to the fabric material 26 or by the fibers or other elongated fabric elements of the fabric material 26 themselves.

In some embodiments, to facilitate the interpretation of the color change, a color key can be printed or otherwise applied on the glove 10 such that the wearer can determine the kind of noxious agent present and its concentration in absolute terms or in relative terms, such as its degree of severity. For example, the color key may have independent color zones for different types of noxious agents, with the detectors for the noxious agents placed adjacent the respective keys such that a color change can be readily compared to the key.

As yet another example, in some embodiments, the fabric material 26 may also serve as an end-of-service-life indicator (ESLI). For instance, the fabric material 26 may be embedded with a sorbent such as to absorb a targeted agent to which the glove 10 is exposed. Once the sorbent has absorbed a given amount of targeted agent, it undergoes a color change indicating that the service life of the glove 10 is nearing its end and consequently that the glove 10 needs replacement. This may be useful where the wearer wants to know more accurately when the glove 10 needs to be replaced rather than by counting a period of time or an amount of usage cycles the glove 10 has been used for.

Figure 14:
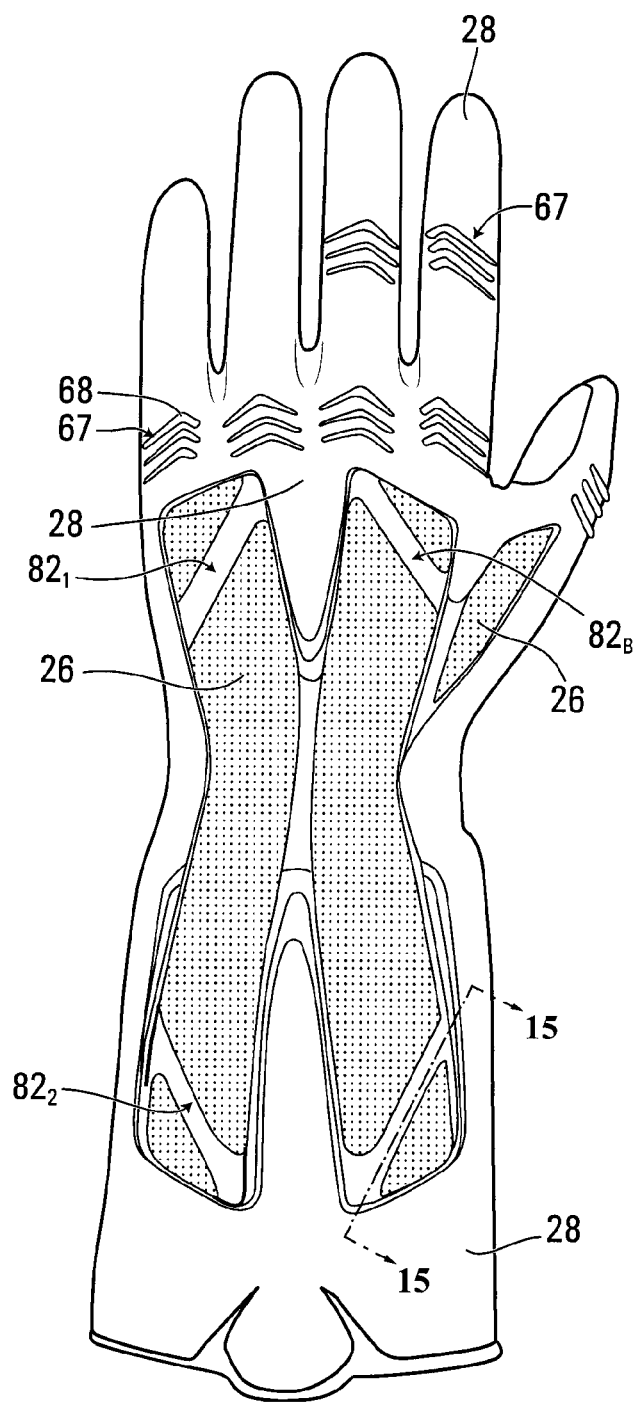
Figure 15:
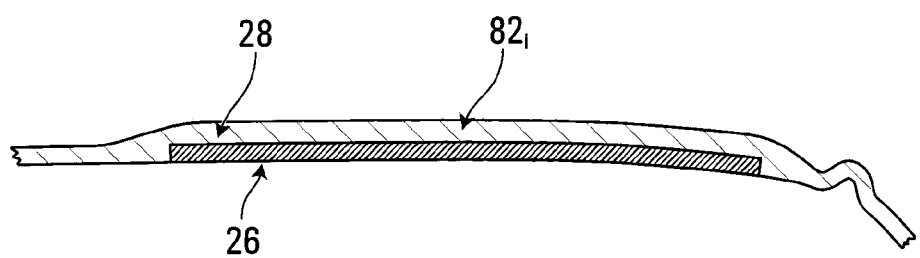
Figure 16:
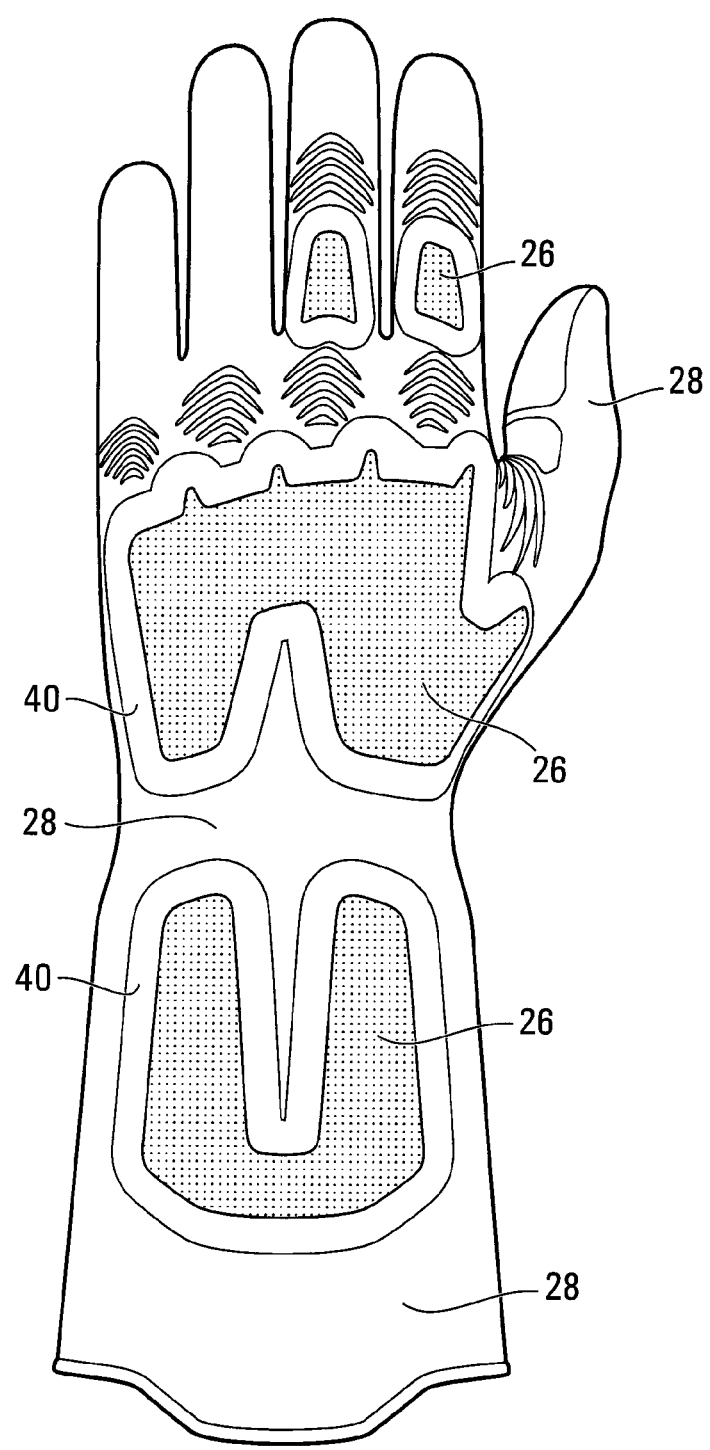
Figure 17:
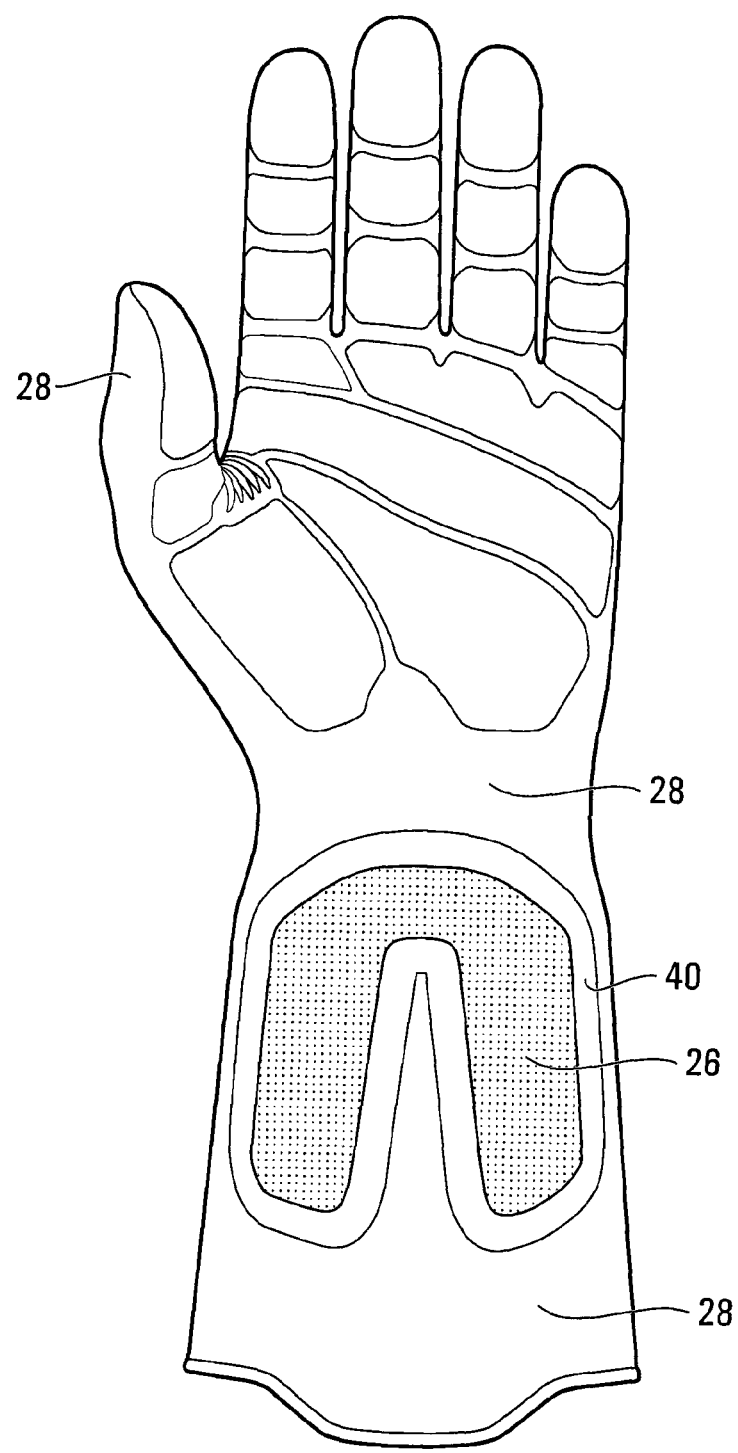
Figure 18:
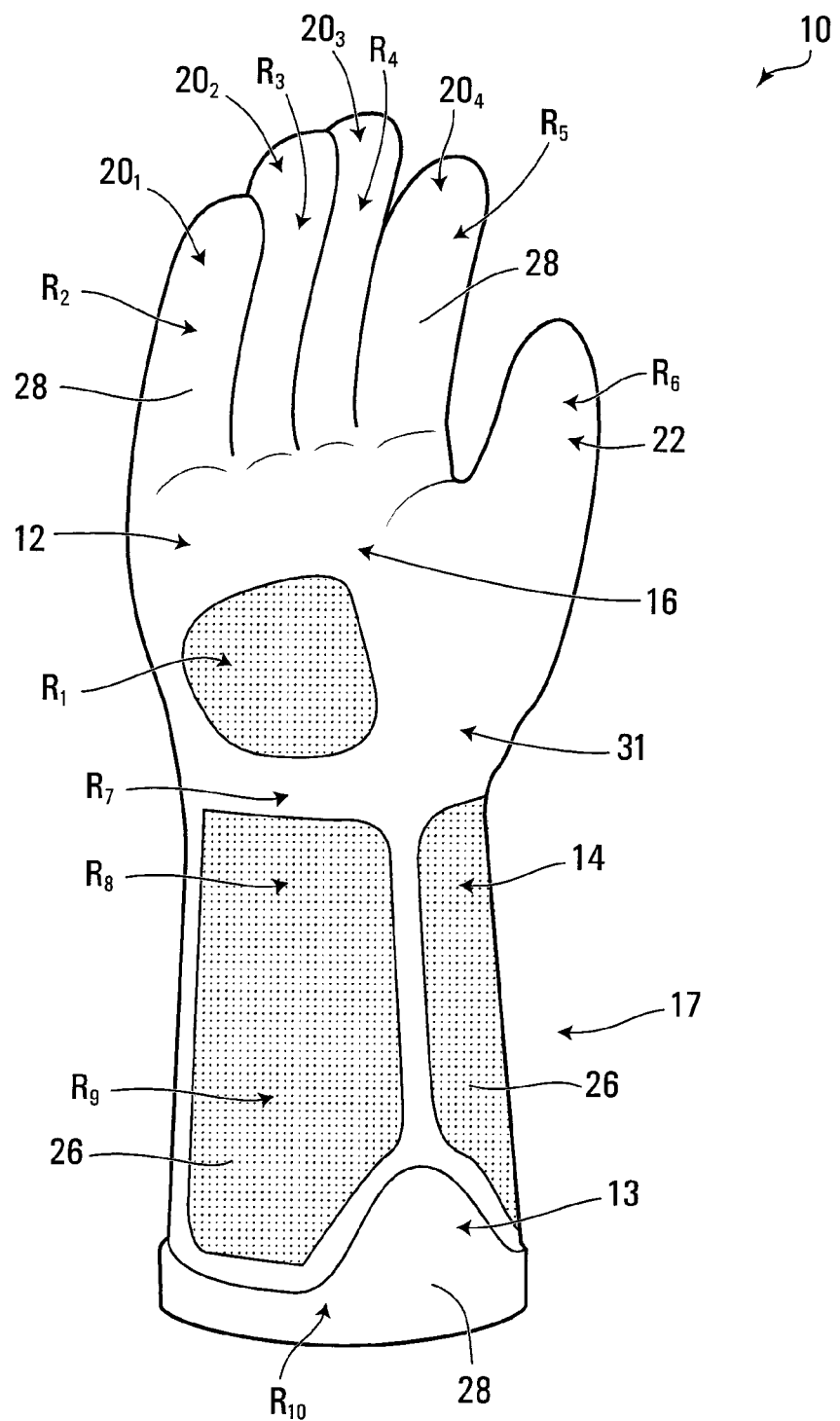
Figure 19:
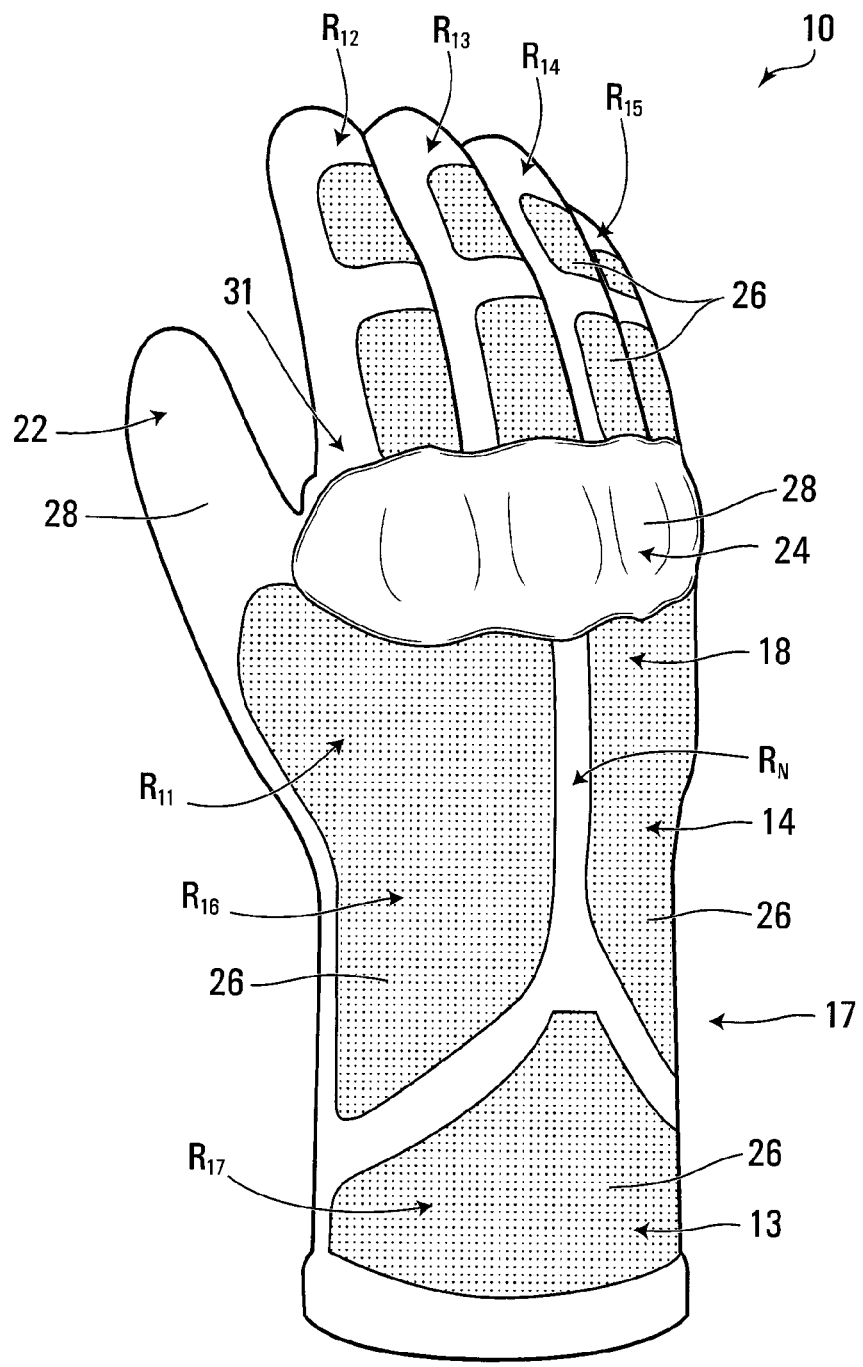

As yet another example, in other embodiments, the selected regions $R_1$-$R_N$ of the glove 10 that have different properties may be configured in any other suitable way. For instance, FIG. 13 shows an embodiment in which regions of the back portion 18, the cuff 14 and the hand covering 13 are made of a single common piece of the fabric material 26. FIGS. 14 and 15 show another embodiment in which reinforcing bridges $82_1$-$82_B$ made of the rubber material 28 extend over and across a piece of the fabric material 26 to strengthen the glove 10. FIGS. 16 and 17 show another embodiment in which the selected regions $R_1$-$R_N$ of the glove 10 are arranged according in another different configuration. FIGS. 18 and 19 show another embodiment in which the selected regions $R_1$-$R_N$ of the glove 10 are arranged according in yet another different configuration. In this example, a significant proportion of the glove's back side is made of the fabric material 26.

As yet another example, while in this embodiment the distinct materials $M_1$-$M_G$ of the glove 10 are the rubber material 28 and the fabric material 26, in other embodiments, the distinct materials $M_1$-$M_G$ of the glove 10 may include any other combination of different materials (which may or may not include rubber and/or fabric).

Although in this embodiment the article of personal protective equipment 10 is a glove, in other embodiments, articles of personal protective equipment constructed using principles described herein in respect of the glove 10 may be any other type of article of personal protective equipment for a wearer working in an environment where he/she may be exposed to noxious agents.

Figure 21:
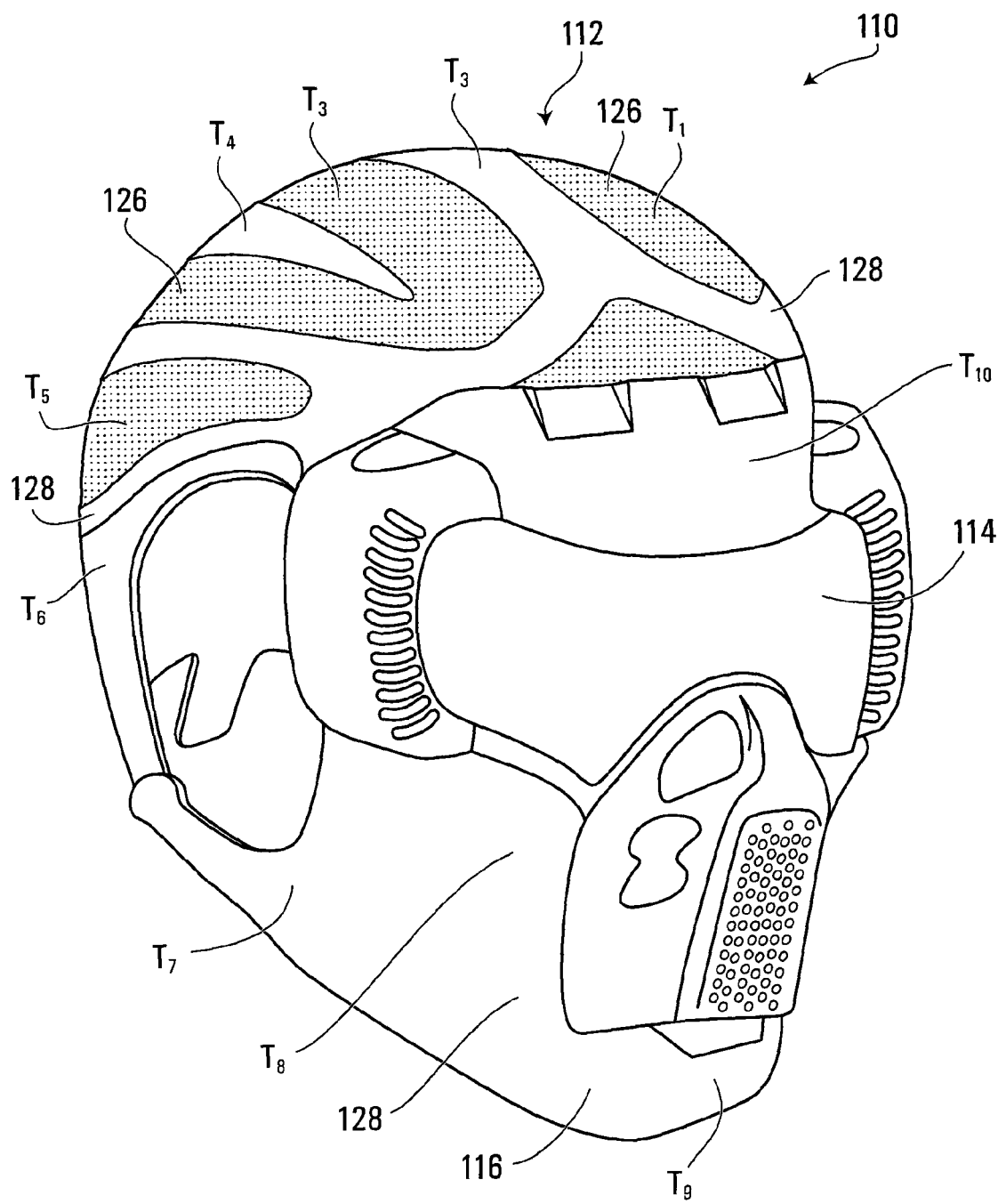
FIG. 21 shows another example of an article of personal protective equipment, namely a protective headgear, in accordance with another embodiment of the invention.

For example, FIG. 21 shows an embodiment in which an article of personal protective equipment is a protective headgear 110 constructed using principles described herein in respect of the glove 10. In this embodiment, the protective headgear 110 is a CBRN protective headgear including a mask to protect the wearer's face and respiratory system against a chemical, biological, radiological or nuclear hazard to which the wearer may be exposed.

The protective headgear 110 comprises a head portion 112 for covering a forehead and head of the wearer, a visor portion 114 for shielding the wearer's eyes of the wearer, and a face portion 116 for covering the wearer's face. In this embodiment, the head portion 112 and the face portion 116 are configured to provide selective protection, breathability, heat loss, and/or other functionality in different regions of the protective headgear 110 that cover different parts of the wearer's head and face, thereby allowing the protective headgear 110 to be tailored or optimized in terms of protection, performance and comfort.

Selected regions $T_1$-$T_M$ of the protective headgear 110 have different properties, such as different levels of protection, breathability, heat loss, and/or another function. This is achieved by the selected regions $T_1$-$T_M$ of the protective headgear 110 having different structures (e.g., different material compositions or different thicknesses of a common material composition), following substantially similar principles as those discussed above in relation to the glove 10. More particularly, in this embodiment, the selected regions $T_1$-$T_M$ of the protective headgear 110 may include distinct materials, including a fabric material 126 and a membranous material 128 (e.g., a rubber material).

Thus, for example, the head portion 112 may have one or more regions $T_i$-$T_n$ made of the fabric material 126 which may provide higher breathability and/or heat loss capability than one or more regions $T_o$-$T_u$ of the head portion 112 and the face portion 116 made of the membranous material 128, which in turn may provide higher noxious fluid penetration resistance than the one or more regions $T_i$-$T_n$.

Figure 22:
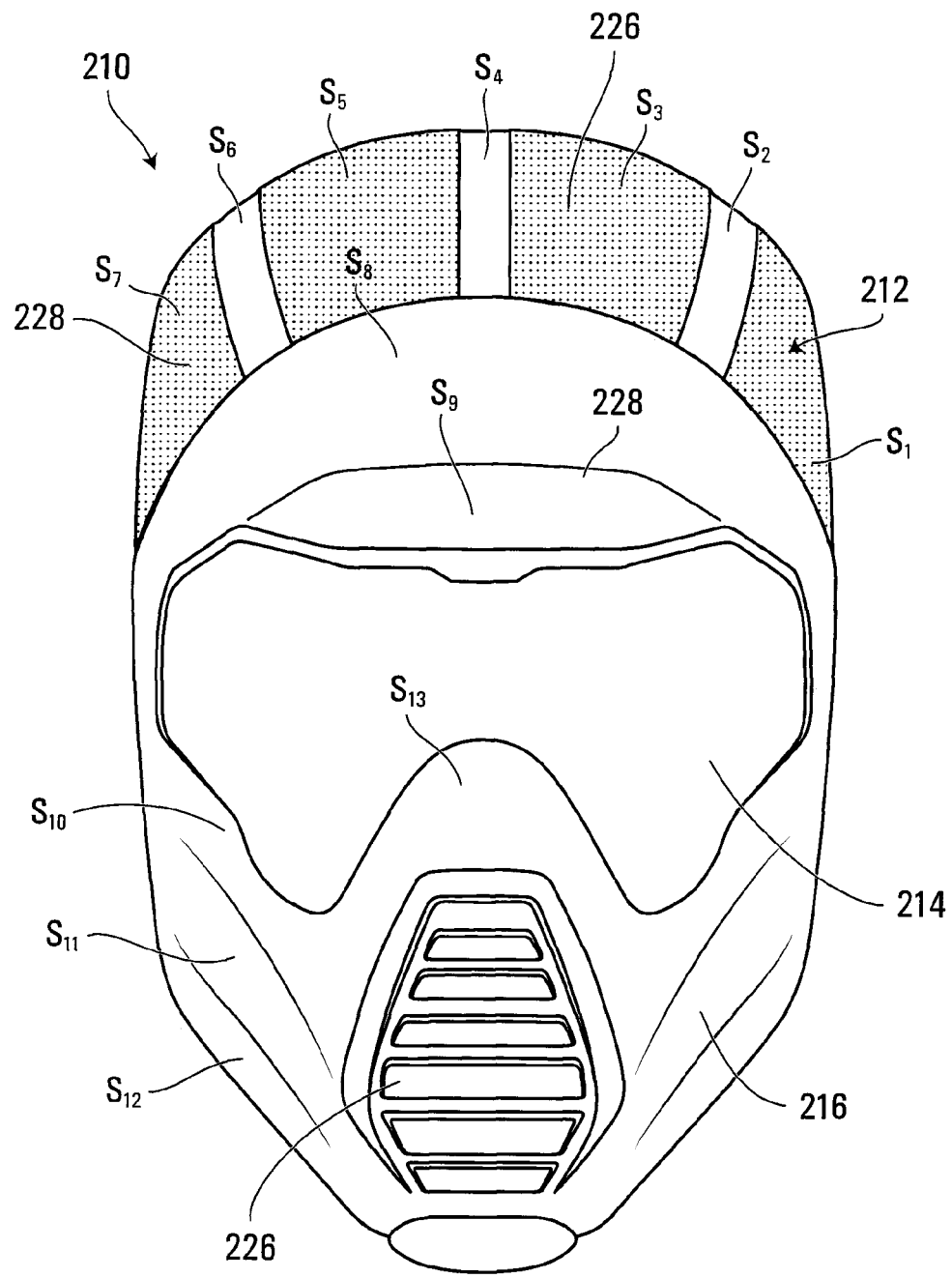
FIG. 22 shows another example of an article of personal protective equipment, namely another protective headgear, in accordance with another embodiment of the invention.

FIG. 22 shows another embodiment of a CBRN protective headgear 210. Selected regions $S_1$-$S_M$ of the protective headgear 210 have different properties, such as different levels of protection, breathability, heat loss, and/or another function. This is achieved by the selected regions $S_1$-$S_M$ of the protective headgear 210 having different structures (e.g., different material compositions or different thicknesses of a common material composition), following substantially similar principles as those discussed above in relation to the glove 10. More particularly, in this embodiment, the selected regions $S_1$-$S_M$ of the protective headgear 210 may include distinct materials, including a fabric material 226 and a membranous material 228 (e.g., a rubber material).

Thus, for example, the head portion 212 may have one or more regions $S_i$-$S_n$ made of fabric material 226 which may provide higher breathability and/or heat loss capability than one or more regions $S_o$-$S_u$ of the head portion 212 and the face portion 216 made of membranous material 228, which in turn may provide higher noxious fluid penetration resistance than the one or more regions $S_i$-$S_n$.

Figure 23:
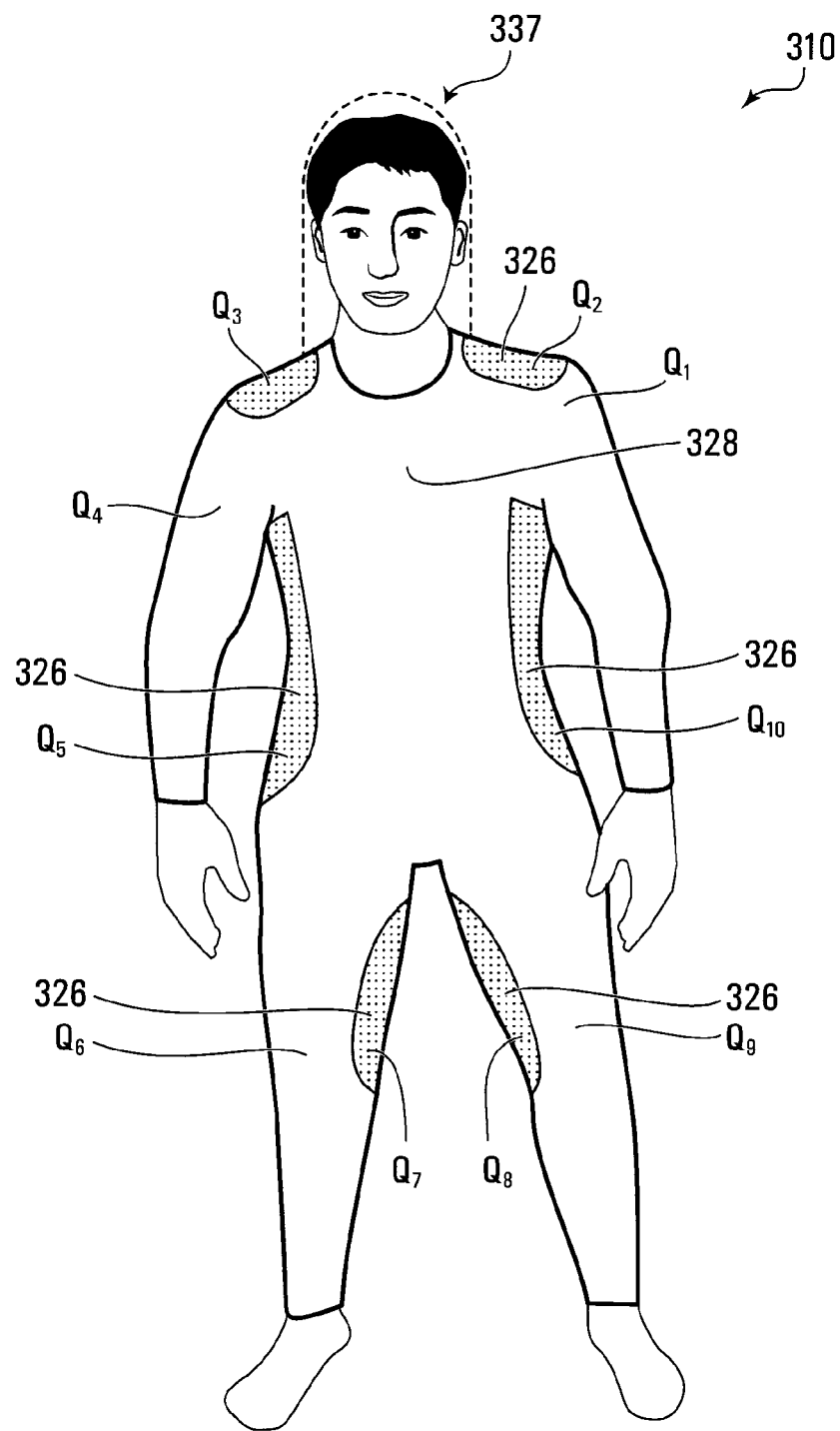
FIGS. 23 and 24 show another example of an article of personal protective equipment, namely a protective suit, in accordance with another embodiment of the invention.
Figure 24:
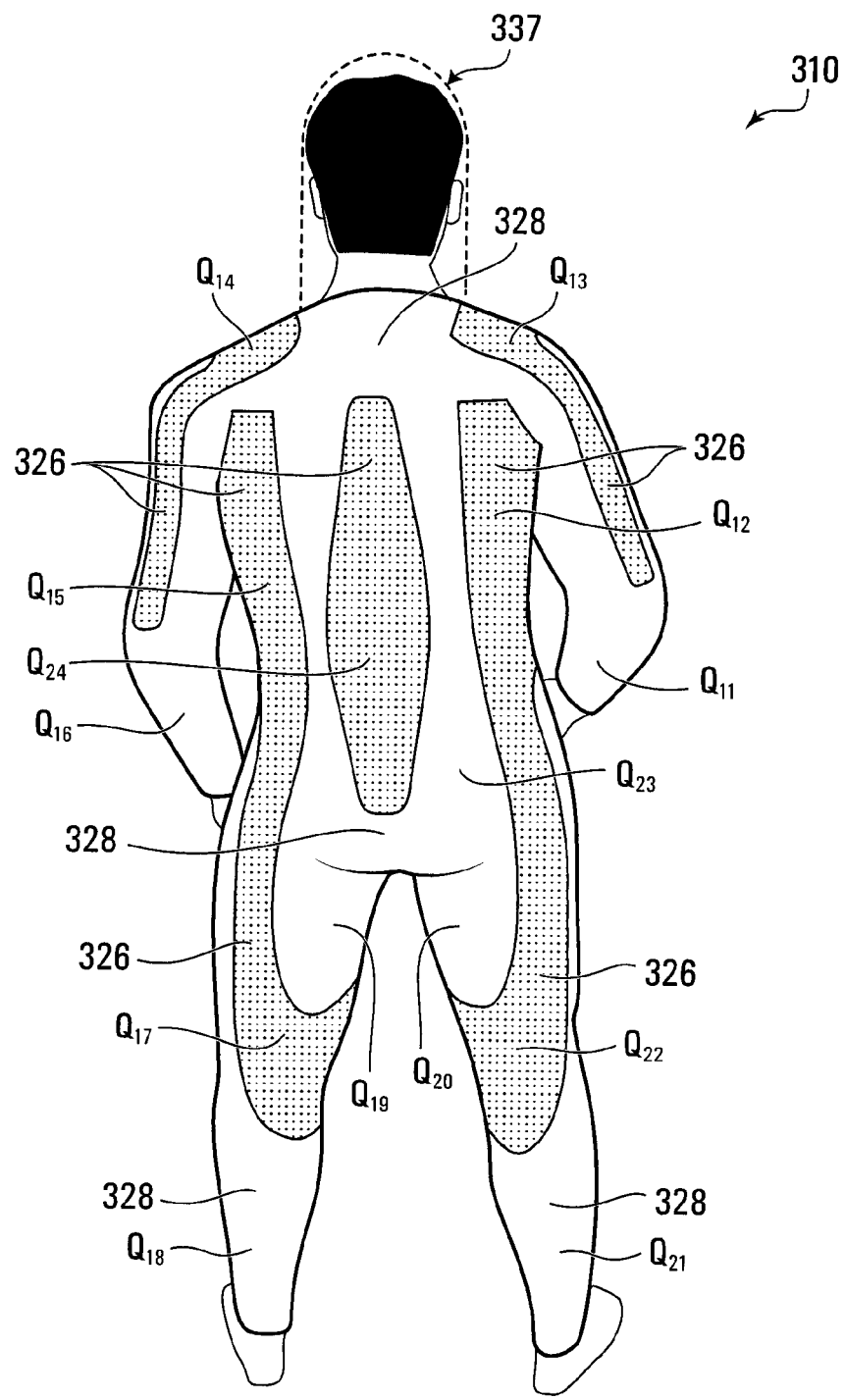

As another example, FIGS. 23 and 24 show an embodiment in which an article of personal protective equipment is a protective suit 310 constructed using principles described herein in respect of the glove 10. In this embodiment, the protective suit 310 is a CBRN protective suit to protect the wearer's upper body and lower body, including his/her torso, neck, arms and legs, against a chemical, biological, radiological or nuclear hazard to which the wearer may be exposed.

The protective suit 310 is configured for generally covering a body of the wearer. In this case, the protective suit 310 may also comprise a hood 337 for generally covering a head of the wearer. In this embodiment, the protective suit 310 is configured to provide selective protection, breathability, heat loss, and/or other functionality in different regions of the protective suit 310, thereby allowing the protective suit 310 to be tailored or optimized in terms of protection, performance and comfort.

Selected regions $Q_1$-$Q_M$ of the protective suit 310 have different properties, such as different levels of protection, breathability, heat loss, and/or another function. This is achieved by the selected regions $Q_1$-$Q_M$ of the protective suit 310 having different structures (e.g., different material compositions or different thicknesses of a common material composition), following substantially similar principles as those discussed above in relation to the glove 10. More particularly, in this embodiment, the selected regions $Q_1$-$Q_M$ of the protective suit 310 include distinct materials, including a fabric material 326 and a membranous material 328 (e.g., a rubber material).

Thus, for example, the protective suit 310 may have one or more regions $Q_i$-$Q_n$ made of the fabric material 326 which may provide higher breathability and/or heat loss capability than one or more regions $Q_o$-$Q_u$ made of the membranous material 328, which in turn may provide higher noxious fluid penetration resistance than the one or more regions $Q_i$-$Q_n$. For instance, in some embodiments, elbow and knee regions of the protective suit 310 may provide higher noxious fluid penetration resistance since they are more likely to be subject to pressure; a chest region of the protective suit 310 may provide higher noxious fluid penetration resistance; and/or armpit, torsal side, and back regions of the protective suit 310 may provide lower noxious fluid penetration resistance but higher heat loss and breathability since they may be less likely to be directly exposed or in contact with hazardous agents. A region of the protective suit 310 covered by or covering another article of personal protective equipment, such as the hood 337 over or under a protective headgear and/or a sleeve under or over a protective glove, may provide lower noxious fluid penetration resistance but higher heat loss capability or breathability.

Figure 25:
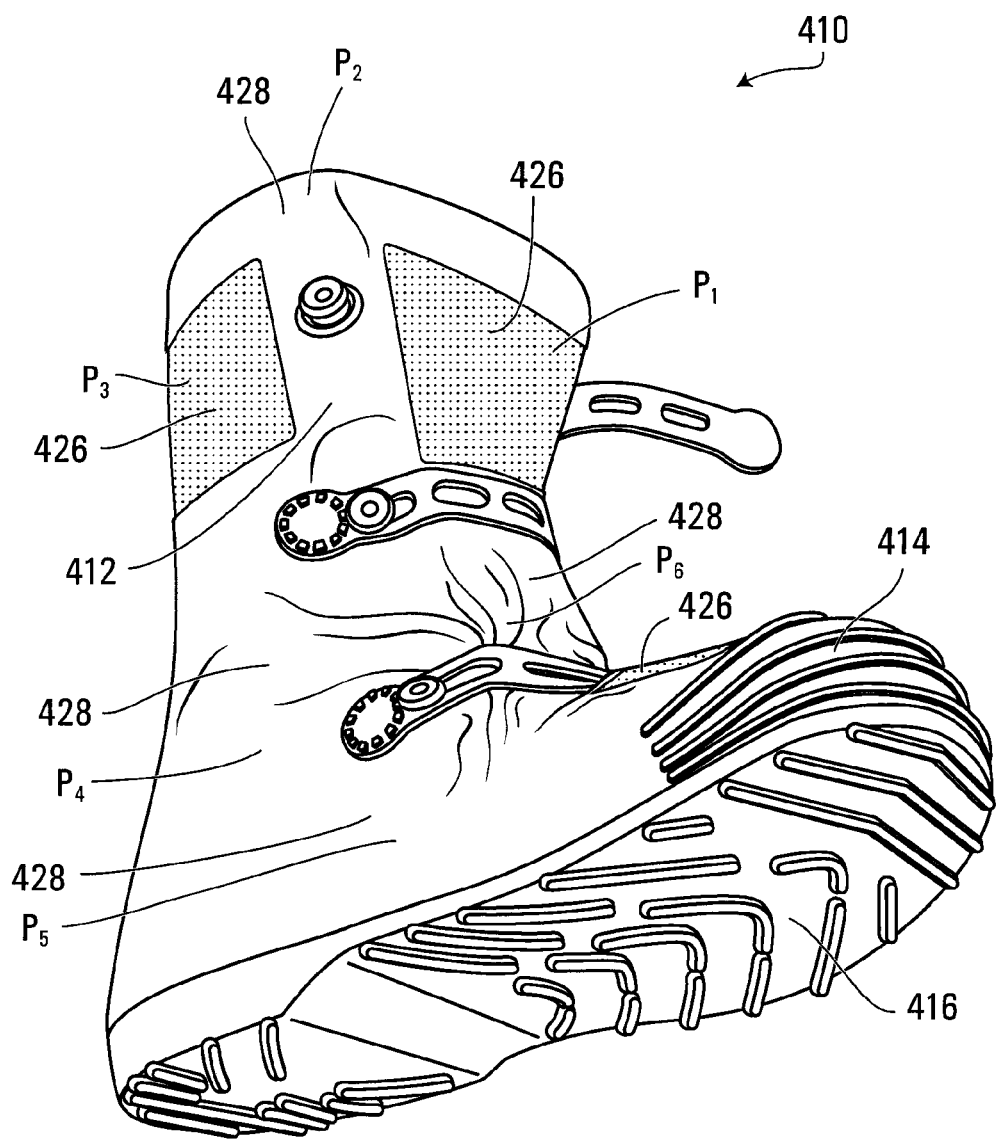
FIG. 25 shows another example of an article of personal protective equipment, namely a protective overboot, in accordance with another embodiment of the invention.

As another example, FIG. 25 shows an embodiment in which an article of personal protective equipment is a protective footwear 410 constructed using principles described herein in respect of the glove 10. In this embodiment, the protective overboot 410 is a CBRN protective overboot to protect the wearer's foot and lower leg against a chemical, biological, radiological or nuclear hazard to which the wearer may be exposed.

The protective overboot 410 may comprise an ankle portion 412 for covering an ankle and lower leg of the wearer and a foot portion 413 for covering a foot of the wearer. The foot portion 413 comprises a toe portion 414 for covering toes of the wearer and a sole portion 416 for covering an underside of the wearer's foot and engaging the ground. The protective overboot 410 is configured to provide selective protection, breathability, heat loss, and/or other functionality in different regions of the protective overboot 410 that cover different parts of the wearer's lower leg, ankle, and foot, thereby allowing the protective overboot 410 to be tailored or optimized in terms of protection, performance and comfort.

Selected regions $P_1$-$P_M$ of the protective overboot 410 have different properties, such as different levels of protection, breathability, heat loss, and/or another function. This is achieved by the selected regions $P_1$-$P_M$ of the protective overboot 410 having different structures (e.g., different material compositions or different thicknesses of a common material composition), following substantially similar principles as those discussed above in relation to the glove 10. More particularly, in this embodiment, the selected regions $P_1$-$P_M$ of the protective overboot 410 include distinct materials, including a fabric material 426 and a membranous material 428 (e.g., a rubber material).

Thus, for example, the ankle portion 412 may have one or more regions $P_i$-$P_n$ made of the fabric material 426 which may provide higher breathability and/or heat loss capability than one or more regions $P_o$-$P_u$ of the ankle portion 412 and the foot portion 413 that are made of the membranous material 428, which in turn may provide higher noxious fluid penetration resistance than the one or more regions $P_i$-$P_n$. A top region, such as an instep region, of the foot portion 413 may be made of the fabric material 426 to provide higher heat loss capability or breathability but lower noxious fluid penetration resistance than a bottom region (e.g., a sole region) of the foot portion 413 since it is less likely to be subject to pressure.

Any feature of any embodiment discussed herein may be combined with any feature of any other embodiment discussed herein in some examples of implementation.

Certain additional elements that may be needed for operation of certain embodiments have not been described or illustrated as they are assumed to be within the purview of those of ordinary skill in the art. Moreover, certain embodiments may be free of, may lack and/or may function without any element that is not specifically disclosed herein.

Although various embodiments and examples have been presented, this was for the purpose of describing, but not limiting, the invention. Various modifications and enhancements will become apparent to those of ordinary skill in the art and are within the scope of the invention, which is defined by the appended claims.

The invention claimed is:

1. A protective glove for protecting a wearer against noxious agents, the protective glove comprising:
   a hand covering for receiving a hand of the wearer, the hand covering comprising a palm portion for facing a palm of the wearer's hand, a back portion for facing a back of the wearer's hand, finger portions for receiving fingers of the wearer's hand, and a thumb portion for receiving a thumb of the wearer's hand; and
   a cuff for receiving a wrist of the wearer and extending towards a forearm of the wearer;
wherein:
   a plurality of regions of the protective glove have different properties and are disposed to cover different parts of at least one of the wearer's hand, wrist and forearm;
   each of the regions of the protective glove provides a level of protection against noxious agents;
   the level of protection against noxious agents of relatively more protective ones of the regions of the protective glove is greater than the level of protection against noxious agents of relatively less protective ones of the regions of the protective glove; and
   the relatively less protective ones of the regions of the protective glove are non-contiguous and spaced apart from one another by the relatively more protective ones of the regions of the protective glove.

2. The protective glove of claim 1, wherein a material composition of the relatively more protective ones of the regions of the protective glove is different from a material composition of the relatively less protective ones of the regions of the protective glove.

3. The protective glove of claim 2, wherein the material composition of the relatively more protective ones of the regions of the protective glove comprises a membranous material and the material composition of the relatively less protective ones of the regions of the protective glove comprises a fabric material.

4. The protective glove of claim 1, wherein the level of protection against noxious agents is a noxious fluid penetration resistance.

5. The protective glove of claim 4, wherein a ratio of (i) the noxious fluid penetration resistance of the relatively more protective ones of the regions of the protective glove over (ii) the noxious fluid penetration resistance of the relatively less protective ones of the regions of the protective glove is at least 1.1.

6. The protective glove of claim 4, wherein a ratio of (i) the noxious fluid penetration resistance of the relatively more protective ones of the regions of the protective glove over (ii) the noxious fluid penetration resistance of the relatively less protective ones of the regions of the protective glove is at least 2.

7. The protective glove of claim 1, wherein the level of protection against noxious agents is an infectious agent penetration resistance.

8. The protective glove of claim 7, wherein a ratio of (i) the infectious agent penetration resistance of the relatively more protective ones of the regions of the protective glove over (ii) the infectious agent penetration resistance of the relatively less protective ones of the regions of the protective glove is at least 1.1.

9. The protective glove of claim 7, wherein a ratio of (i) the infectious agent penetration resistance of the relatively more protective ones of the regions of the protective glove over (ii) the infectious agent penetration resistance of the relatively less protective ones of the regions of the protective glove is at least 2.

10. The protective glove of claim 1, wherein each of the regions of the protective glove has a heat loss capability and the heat loss capability of the relatively less protective ones of the regions of the protective glove is greater than the heat loss capability of the relatively more protective ones of the regions of the protective glove.

11. The protective glove of claim 10, wherein a ratio of (i) the heat loss capability of the relatively less protective ones of the regions of the protective glove over (ii) the heat loss capability of the relatively more protective ones of the regions of the protective glove is at least 2.

12. The protective glove of claim 10, wherein a ratio of (i) the heat loss capability of the relatively less protective ones of the regions of the protective glove over (ii) the heat loss capability of the relatively more protective ones of the regions of the protective glove is at least 3.

13. The protective glove of claim 1, wherein each of the regions of the protective glove has a breathability and the breathability of the relatively less protective ones of the regions of the protective glove is greater than the breathability of the relatively more protective ones of the regions of the protective glove.

14. The protective glove of claim 13, wherein a ratio of (i) the breathability of the relatively less protective ones of the regions of the protective glove over (ii) the breathability of the relatively more protective ones of the regions of the protective glove is at least 2.

15. The protective glove of claim 13, wherein a ratio of (i) the breathability of the relatively less protective ones of the regions of the protective glove over (ii) the breathability of the relatively more protective ones of the regions of the protective glove is at least 3.

16. The protective glove of claim 1, wherein each of the regions of the protective glove has a tactility and the tactility of the relatively more protective ones of the regions of the protective glove is greater than the tactility of the relatively less protective ones of the regions of the protective glove.

17. The protective glove of claim 1, wherein: the relatively more protective ones of the regions of the protective glove include a first material and the relatively less protective ones of the regions of the protective glove include a second material different from the first material and mechanically interlocked with the first material, such that the first material includes a part that overlays the second material and a part that does not overlay the second material, and the second material includes a part that is overlaid by the first material and a part that is not overlaid by the first material.

18. The protective glove of claim 17, wherein the first material is overmolded onto the second material.

19. A protective glove for protecting a wearer against noxious agents, the protective glove comprising:
a. a hand covering for receiving a hand of the wearer, the hand covering comprising a palm portion for facing a palm of the wearer's hand, a back portion for facing a back of the wearer's hand, finger portions for receiving fingers of the wearer's hand, and a thumb portion for receiving a thumb of the wearer's hand; and b. a cuff for overlying a wrist of the wearer and extending towards a forearm of the wearer;

wherein:
a plurality of regions of the protective glove have different properties and are disposed to cover different parts of at least one of the wearer's hand, wrist and forearm;
each of the regions of the protective glove has a noxious fluid penetration resistance and a heat loss capability;
the noxious fluid penetration resistance of a first subset of the regions of the protective glove is greater than the noxious fluid penetration resistance of a second subset of the regions of the protective glove;
the heat loss capability of the first subset of the regions of the protective glove is less than the heat loss capability of the second subset of the regions of the protective glove; and
respective ones of the second subset of the regions of the protective glove are non-contiguous and spaced apart from one another by respective ones of the first subset of the regions of the protective glove.

20. A protective glove for protecting a wearer against noxious agents, the protective glove comprising:
a. a hand covering for receiving a hand of the wearer, the hand covering comprising a palm portion for facing a palm of the wearer's hand, a back portion for facing a back of the wearer's hand, finger portions for receiving fingers of the wearer's hand, and a thumb portion for receiving a thumb of the wearer's hand; and
b. a cuff for receiving a wrist of the wearer and extending towards a forearm of the wearer;

wherein:
a plurality of regions of the protective glove have different properties and are disposed to cover different parts of at least one of the wearer's hand, wrist and forearm;
c. a first subset of the regions of the protective glove includes a first material;
d. a second subset of the regions of the protective glove are non-contiguous and include a second material different from the first material; and
e. the first material and the second material are joined by the first material extending into the second material, such that the first material includes a part that overlays the second material and a part that does not overlay the second material, and the second material includes a part that is overlaid by the first material and a part that is not overlaid by the first material.

21. The protective glove of claim 20, wherein the first material surrounds and is overmolded onto edges of the second material.

22. The protective glove of claim 21, wherein the first material is an elastomeric material and the second material is a fabric material.

23. A CBRN protective glove comprising:
a) a hand portion for receiving a hand of a wearer, the hand portion including:
(i) a palm portion for facing a palm of the wearer's hand;
(ii) a back portion for facing a back of the wearer's hand;
(iii) finger portions for receiving fingers of the wearer's hand; and
(iii) a thumb portion for receiving a thumb of the wearer's hand; and b) a cuff portion for receiving a wrist of the wearer and extending toward a forearm of the wearer;

wherein:

the palm portion includes a first material with a level of protection against ingress of noxious agents that is higher than a level of protection against ingress of noxious agents manifested by a second material included in the back portion; and first material is molded to the second material, such that the first material includes a part that overlays the second material and a part that does not overlay the second material, and the second material includes a part that is overlaid by the first material and a part that is not overlaid by the first material.

24. A CBRN protective glove comprising:
a) a hand portion for receiving a hand of a wearer, the hand portion including:
  (i) a palm portion for facing a palm of the wearer's hand;
  (ii) a back portion for facing a back of the wearer's hand;
  (iii) finger portions for receiving fingers of the wearer's hand; and
  (iv) a thumb portion for receiving a thumb of the wearer's hand; and
b) a cuff portion for receiving a wrist of the wearer and extending toward a forearm of the wearer;

wherein:

one of the portions includes a fibrous material, the fibrous material including fibers defining interstices therebetween;

another of the portions includes a membranous material;

the fibrous material is jointed to the membranous material along an area of juncture; and the fibers of the fibrous material at the area of juncture are embedded in the membranous material, such that the membranous material includes a part that overlays the fibrous material and a part that does not overlay the fibrous material, and the fibrous material includes a part that is overlaid by the membranous material and a part that is not overlaid by the membranous material.

25. The protective glove of claim 1, wherein a given one of the relatively less protective ones of the regions of the protective glove is located at least partially in the back portion of the hand covering and includes a patterned piece of material at least partially surrounded by a first edge, the first edge being joined to an adjacent one of the relatively more protective ones of the regions of the protective glove via molding of the adjacent one of the relatively more protective ones of the regions of the protective glove to the first edge.

26. The protective glove of claim 25, wherein the given one of the relatively less protective ones of the regions of the protective glove is confined in the back portion of the hand covering.

27. The protective glove of claim 25, wherein the given one of the relatively less protective ones of the regions of the protective glove is located at least partially in the cuff.

28. The protective glove of claim 25, wherein the given one of the relatively less protective ones of the regions of the protective glove is a first given one of the relatively less protective ones of the regions of the protective glove, the adjacent one of the relatively more protective ones of the regions of the protective glove is a first adjacent one of the relatively more protective ones of the regions of the glove, and a second given one of the relatively less protective ones of the regions of the protective glove is surrounded by a second adjacent one of the relatively more protective ones of the regions of the protective glove and is disposed at least partially in the back portion of the hand covering.

29. The protective glove of claim 1, wherein the relatively more protective ones of the regions of the protective glove include an elastomeric material and the relatively less protective ones of the regions of the protective glove include a fabric material.

30. The protective glove of claim 29, wherein the elastomeric material is a rubber material.

31. The protective glove of claim 29, wherein the fabric material comprises a woven fabric.

32. The protective glove of claim 31, wherein the fabric material is a fabric laminate.

33. The protective glove of claim 32, wherein the fabric laminate comprises a fabric layer and a non-fabric layer.

34. The protective glove of claim 29, wherein the fabric material includes active particles.

35. The protective glove of claim 34, wherein the active particles are microporous particles.

36. The protective glove of claim 35, wherein the microporous particles are activated carbon particles.

37. The protective glove of claim 25, wherein a given one of the relatively more protective ones of the regions of the protective glove is located in the palm portion of the hand covering.

* * * * *